US010010971B1

(12) United States Patent
Hosseini

(10) Patent No.: US 10,010,971 B1
(45) Date of Patent: Jul. 3, 2018

(54) METHOD AND APPARATUS FOR PERFORMING LASER CURVED FILAMENTATION WITHIN TRANSPARENT MATERIALS

(71) Applicant: ROFIN-SINAR TECHNOLOGIES INC., Plymouth, MI (US)

(72) Inventor: S. Abbas Hosseini, Orlando, FL (US)

(73) Assignee: ROFIN SINAR TECHNOLOGIES LLC, Plymouth, MI (US)

( * ) Notice: Subject to any disclaimer, the term of this patent is extended or adjusted under 35 U.S.C. 154(b) by 0 days.

(21) Appl. No.: 15/665,173

(22) Filed: Jul. 31, 2017

Related U.S. Application Data

(63) Continuation of application No. 14/742,187, filed on Jun. 17, 2015, now Pat. No. 9,757,815.

(51) Int. Cl.
*B23K 26/0622* (2014.01)
*B23K 26/00* (2014.01)
(Continued)

(52) U.S. Cl.
CPC ...... *B23K 26/0057* (2013.01); *B23K 26/0006* (2013.01); *B23K 26/0624* (2015.10);
(Continued)

(58) Field of Classification Search
CPC ............ B23K 26/0622; B23K 26/0006; B23K 26/0057; C03B 33/04; C03B 33/0033; C03B 33/091
See application file for complete search history.

(56) References Cited

U.S. PATENT DOCUMENTS

| 5,107,510 A | 4/1992 | Seguin et al. |
| 6,084,897 A | 7/2000 | Wakabayashi et al. |
(Continued)

FOREIGN PATENT DOCUMENTS

| CA | 2332154 | 9/2009 |
| CA | 2907757 | 9/2014 |
(Continued)

OTHER PUBLICATIONS

European Patent Office, Extended European Search Report, dated Mar. 18, 2015, pp. 1-6, Application No. 14179402.4, Applicant: Rofin-Sinar Technologies, Inc.
(Continued)

*Primary Examiner* — Joseph L Williams
(74) *Attorney, Agent, or Firm* — Woodling, Krost and Rust

(57) ABSTRACT

Systems and methods are described for forming continuous curved laser filaments in transparent materials. The filaments are preferably curved and C-shaped. Filaments may employ other curved profiles (shapes). A burst of ultrafast laser pulses is focused such that a beam waist is formed external to the material being processed without forming an external plasma channel, while a sufficient energy density is formed within an extended region within the material to support the formation of a continuous filament, without causing optical breakdown within the material. Filaments formed according to this method may exhibit lengths in the range of 100 μm-10 mm. An aberrated optical focusing element is employed to produce an external beam waist while producing distributed focusing of the incident beam within the material. Optical monitoring of the filaments may be employed to provide feedback to facilitate active control of the process.

22 Claims, 14 Drawing Sheets

(51) Int. Cl.

| | | |
|---|---|---|
| *B23K 26/06* | (2014.01) | |
| *B23K 26/082* | (2014.01) | |
| *B23K 26/38* | (2014.01) | |
| *C03B 33/02* | (2006.01) | |
| *C03B 33/033* | (2006.01) | |
| *C03B 33/04* | (2006.01) | |
| *C03B 33/07* | (2006.01) | |
| *B23K 103/00* | (2006.01) | |
| *B23K 103/16* | (2006.01) | |

(52) U.S. Cl.
CPC ........ *B23K 26/0648* (2013.01); *B23K 26/082* (2015.10); *B23K 26/38* (2013.01); *C03B 33/0222* (2013.01); *C03B 33/033* (2013.01); *C03B 33/04* (2013.01); *C03B 33/07* (2013.01); *B23K 2203/16* (2013.01); *B23K 2203/166* (2015.10); *B23K 2203/42* (2015.10); *B23K 2203/50* (2015.10); *B23K 2203/52* (2015.10); *B23K 2203/54* (2015.10); *B23K 2203/56* (2015.10)

(56) References Cited

U.S. PATENT DOCUMENTS

| | | |
|---|---|---|
| 6,407,360 B1 | 6/2002 | Choo et al. |
| 6,552,301 B2 | 4/2003 | Herman et al. |
| 7,033,519 B2 | 4/2006 | Taylor et al. |
| 7,211,184 B2 | 5/2007 | Webster et al. |
| 7,218,448 B1 | 5/2007 | Cathey, Jr. et al. |
| 7,303,977 B2 | 12/2007 | Voronov et al. |
| 7,605,344 B2 | 10/2009 | Fukumitsu |
| 7,626,138 B2 | 12/2009 | Bovatsek et al. |
| 8,097,830 B2 | 1/2012 | Woeste et al. |
| 8,624,157 B2 | 1/2014 | Albelo et al. |
| 8,835,802 B2 | 9/2014 | Baer |
| 8,842,358 B2 | 9/2014 | Bareman et al. |
| 8,852,698 B2 | 10/2014 | Fukumitsu |
| 2002/0125232 A1 | 9/2002 | Choo et al. |
| 2002/0195433 A1 | 12/2002 | Troitski |
| 2003/0006221 A1 | 1/2003 | Hong et al. |
| 2004/0017428 A1 | 1/2004 | Cronin et al. |
| 2004/0248503 A1 | 12/2004 | Benderly |
| 2005/0269301 A1 | 12/2005 | Burrowes et al. |
| 2006/0108339 A1 | 5/2006 | Nishiwaki et al. |
| 2006/0207976 A1 | 9/2006 | Bovatsek et al. |
| 2007/0051706 A1 | 3/2007 | Bovatsek et al. |
| 2009/0151996 A1 | 6/2009 | Mishima et al. |
| 2009/0294422 A1 | 12/2009 | Lubatschowski et al. |
| 2010/0025387 A1 | 2/2010 | Arai et al. |
| 2010/0084384 A1 | 4/2010 | Bovatsek et al. |
| 2011/0259631 A1 | 10/2011 | Rumsby |
| 2012/0234807 A1 | 9/2012 | Sercel et al. |
| 2012/0235969 A1 | 9/2012 | Burns et al. |
| 2013/0126573 A1 | 5/2013 | Hosseini et al. |
| 2013/0183837 A1 | 7/2013 | Arai et al. |
| 2013/0293482 A1 | 11/2013 | Burns et al. |
| 2014/0079570 A1 | 3/2014 | Schweitzer et al. |
| 2014/0199519 A1 | 7/2014 | Schillinger et al. |
| 2014/0213040 A1 | 7/2014 | Morikazu et al. |
| 2014/0340730 A1 | 11/2014 | Bergh et al. |
| 2015/0166393 A1 | 6/2015 | Marjanovic et al. |
| 2015/0166394 A1 | 6/2015 | Marjanovic et al. |
| 2015/0360991 A1 | 12/2015 | Grundmueller et al. |
| 2015/0367442 A1 | 12/2015 | Bovatsek et al. |
| 2016/0009586 A1 | 1/2016 | Bookbinder et al. |
| 2016/0031745 A1 | 2/2016 | Ortner et al. |
| 2016/0059359 A1 | 3/2016 | Krueger et al. |
| 2016/0060156 A1 | 3/2016 | Krueger et al. |

FOREIGN PATENT DOCUMENTS

| | | |
|---|---|---|
| CN | 102785031 | 4/2015 |
| EP | 2781296 | 9/2014 |
| EP | 2868421 A1 | 5/2015 |
| EP | 2754524 | 11/2015 |
| JP | 2006305803 | 11/2006 |
| JP | 2009066627 A | 4/2009 |
| JP | 2010160734 | 7/2010 |
| JP | 4692717 | 3/2011 |
| JP | 5089735 | 9/2012 |
| JP | 5271092 | 5/2013 |
| WO | 2009114375 A2 | 9/2009 |
| WO | 2010111089 A2 | 9/2010 |
| WO | 2012006736 | 1/2012 |
| WO | 2014075995 | 5/2014 |
| WO | 2014079570 | 5/2014 |
| WO | 2014111385 | 7/2014 |
| WO | 2014111794 | 7/2014 |
| WO | 2014121261 | 8/2014 |
| WO | 2014134470 | 9/2014 |
| WO | 2014144322 | 9/2014 |
| WO | 2014147048 | 9/2014 |
| WO | 2014161535 | 10/2014 |
| WO | 2015075059 | 5/2015 |
| WO | 2015094994 | 6/2015 |
| WO | 2015095264 | 6/2015 |
| WO | 2016007843 | 1/2016 |
| WO | 2016010949 | 1/2016 |
| WO | 2016079063 | 5/2016 |
| WO | 2016079275 | 5/2016 |

OTHER PUBLICATIONS

Migliore et al., Advances in Laser Singulation of Silicon, Paper #770, pp. 1-6, Coherent, Inc., Santa Clara, CA, USA; HBL Corporation, Daejeon 305-811 Korea.

Watanabe et al., Filamentation in Ultrafast Laser Material Processing, Book for Springer Series "Progress in Ultrafast Intense Laser Science", pp. 1-6.

Yoshino et al., Micromachining with a High Repetition Rate Femtosecond Fiber Laser, JLMN—Journal of Laser Micro/Nanoengineering, 2008, pp. 157-162, vol. 3, No. 3.

Rezaei, Saeid, Burst-Train Generation for Femtosecond Laser Filamentation-Driven Micromachining, Thesis, Graduate Department of Electrical and Computer Engineering, Jan. 2011, pp. 1-118, University of Toronto.

Nguyen et al. Optical Breakdown Versus Filamentation in Fused Silica by use of Femtosecond Infrared Laser Pulses, Optics Letters, vol. 28, No. 17, Sep. 1, 2003, pp. 1591-1593, Department of Physics, Universite Laval, Quebec, Canada.

Nicholson, David, Laser Pulse Filamentation, Submitted Coursework for PH240, Stanford University, Nov. 27, 2011, pp. 1-4.

Zlotnicki, Steve, What Is Cutting Kerf, May 19, 2013, www.esab-cutting.com, pp. 1-4.

Jha et al., An Integrated PCR Microfluidic Chip Incorporating Aseptic Electrochemical Cell Lysis and Capillary Electrophoresis Amperometric DNA Detection for Rapid and Quantitative Genetic Analysis, The Royal Society of Chemistry, Lab on a Chip, 2012, 12, 4455-4464.

Applied Biosystems Chemistry Guide, DNA Sequencing by Capillary Electrophoresis, Second Edition, 2009, pp. 1-250.

PE Applied Biosystems, Automated DNA Sequencing, Chemistry Guide, 1998, pp. 1-245.

Muller et al., Short-Pulse Lasers Enable Transparent Materials Processing, Industrial Photonics, Oct. 2014, pp. 8-10.

Hosseini, S. Abbas, Method and Apparatus for Hybrid Photoacoustic Compression Machining in Transparent Materials Using Filamentation by Burst Ultrafast Laser Pulses, U.S. Appl. No. 14/520,824, filed Oct. 22, 2014, Applicant: Rofin-Sinar Technologies, Inc.

Hosseini, S. Abbas, System for Performing Laser Filamentation Within Transparent Materials, U.S. Appl. No. 14/336,912, filed Jul. 21, 2014, Applicant: Rofin-Sinar Technologies, Inc.

Hosseini, S. Abbas, Method and Apparatus for Performing Laser Filamentation Within Transparent Materials, U.S. Appl. No. 14/336,819, filed Jul. 21, 2014, Applicant: Rofin-Sinar Technologies, Inc.

(56) References Cited

OTHER PUBLICATIONS

Hosseini, S. Abbas, Method of Fabricating a Glass Magnetic Hard Drive Disk Platter Using Filamentation by Burst Ultrafast Laser Pulses, U.S. Appl. No. 14/512,180, filed Oct. 10, 2014, Applicant: Rofin-Sinar Technologies, Inc.

Hosseini, S. Abbas, Method and Apparatus for Machining Diamonds and Gemstones Using Filamentation by Burst Ultrafast Laser Pulses, U.S. Appl. No. 14/521,114, filed Oct. 22, 2014, Applicant: Rofin-Sinar Technologies, Inc.

Hosseini, S. Abbas, Mass Based Filtration Devices and Method of Fabrication Using Bursts of Ultrafast Laser Pulses, U.S. Appl. No. 145531761, filed Nov. 3, 2014, Applicant: Rofin-Sinar Technologies, Inc.

Hosseini , S. Abbas, Method of Closed Form Release for Brittle Materials Using Burst Ultrafast Laser Pulses, U.S. Appl. No. 14/538,648, filed Nov. 11, 2014, Applicant: Rofin-Sinar Technologies, Inc.

Hosseini, S. Abbas, Method and Apparatus for Forward Deposition of Material Onto a Substrate Using Burst Ultrafast Laser Pulse Energy, U.S. Appl. No. 14/542,647, filed Nov. 16, 2014, Applicant: Rofin-Sinar Technologies Inc.

Hosseini, S. Abbas, Method and Apparatus for Spiral Cutting a Glass Tube Using Filamentation by Burst Ultrafast Laser Pulses, U.S. Appl. No. 14/547,729, filed Nov. 19, 2014, Applicant: Rofin-Sinar Technologies Inc.

Hosseini, S. Abbas, Electro/Mechanical Microchips and Method of Making With Burst Ultrafast Laser Pulses, U.S. Appl. No. 14/539,861, filed Nov. 12, 2014, Applicant: Rofin-Sinar Technologies Inc.

Chin et al., The Propagation of Powerful Femtosecond Laser Pulses in Optical Media: Physics, Applications, and New Challenges, Einstein Centennial Review Article, Can. J. Phys. vol. 83, 2005, pp. 863-905.

Hosseini et al., Measurement of a Filament Length Generated by an Intense Femtosecond Laser Pulse Using Electromagnetic Radiation Detection, Applied Physics B, 2003, pp. 583-586, vol. 76, Quebec, Canada.

Hosseini et al., Multi-Parameter Characterization of the Longitudinal Plasma Profile of a Filament: A Comparative Study, Applied Physics B, 2004, pp. 519-523, vol. 79.

Hosseini et al., Competition of Multiple Filaments During the Propagation of Intense Femtosecond Laser Pulses, The American Physical Society, Physical Review A 70, 033802, 2004, pp. 1-12.

Arnold et al., Laser Direct-Write Techniques for Printing of Complex Materials, MRS Bulletin, Jan. 2007, vol. 32 pp. 23-31.

Nagel et al., Laser-Induced Forward Transfer for the Fabrication of Devices, Nanomaterials: Processing and Characterization with Lasers, First Edition, 2012, Published by Wiley-VCH Verlag GMBH & Co. KGAA, pp. 255-316.

Palla-Papavlu et al., Laser Induced Forward Transfer for Materials Patterning, Romanian Reports in Physics, Aug. 2011, vol. 63, Supplement, pp. 1285-1301.

Pique et al., Digital Microfabrication by Laser Decal Transfer, JLMN—Journal of Laser Micro/Nanoengineering, 2008, vol. 3, No. 3, pp. 163-169.

Hosseini, S. Abbas, Method and Apparatus for Non-Ablative, Photoacoustic Compression Machining in Transparent Materials Using Filamentation by Burst Ultrafast Laser Pulses, U.S. Appl. No. 13/958,346, filed Aug. 2, 2013, Applicant: Rofin-Sinar Technologies Inc.

Hosseini, S. Abbas, Method and Apparatus for Laser Processing of Silicon by Filamentation of Burst Ultrafast Laser Pulses, U.S. Appl. No. 14/556,078, filed Nov. 28, 2014, Applicant: Rofin-Sinar Technologies Inc.

Hosseini, S. Abbas, Method and Apparatus for Material Processing Using Multiple Filamentation of Burst Ultrafast Laser Pulses, U.S. Appl. No. 14/629,327, filed Feb. 23, 2015, Applicant: Rofin-Sinar Technologies Inc.

European Patent Office, European Search Report, May 18, 2015, pp. 1-6, Application No. 14193909.0, Applicant: Rofin-Sinar Technologies, Inc.

Hosseini S. Abbas, Method and System for Scribing Heat Processed Transparent Materials, U.S. Appl. No. 14/700,228, filed Apr. 30, 2015, Applicant: Rofin-Sinar Technologies, Inc.

Gill, Jonathan, Creating an Exotic New Form of Light With Simple Optical Elements, Nov. 2014, pp. 1-21, Waldorf School of Garden City, Garden City, New York, Laser Teaching Center, Department of Physics and Astronomy, Stony Brook University, Intel Science Talent Search.

Dowski et al, Extended Depth of Field Through Wave-Front Coding, Applied Optics, Apr. 10, 1995, vol. 34, No. 11, pp. 1859-1866.

Arnison et al, High Resolution Extended Depth of Field Microscopy Using Wavefront Coding, pp. 1-19.

Siviloglou, Georgios A., Accelerating Optical Airy Beams, Dissertation, 2010, pp. 1-166.

Strigin et al, Laser Processing of Glass by Picosecond Pulses, Quantum Electronics, 1994, pp. 732-735, vol. 24, No. 8, Kvantovaya Elektronika and Turpion Ltd.

Bhuyan et al., High Aspect Ratio Taper-Free Microchannel Fabrication Using Femtosecond Bessel Beams, Optics Express, Jan. 18, 2010, pp. 566-574, vol. 18, No. 2.

TOTAL ENERGY IN BURST PULSE ENVELOPE

NUMBER OF PULSES IN BURST

METHOD AND APPARATUS FOR PERFORMING LASER CURVED FILAMENTATION WITHIN TRANSPARENT MATERIALS

This is a continuation of co-pending U.S. patent application Ser. No. 14/742,187 filed Jun. 17, 2015. U.S. patent application Ser. No. 14/742,187 filed Jun. 17, 2015 is incorporated herein in its entirety by reference hereto.

FIELD OF THE INVENTION

The invention is in the field of laser filamentation within transparent materials.

BACKGROUND OF THE INVENTION

The present disclosure is related to systems and methods for the laser processing of materials. More particularly, the present disclosure is related to systems and methods for the singulation and/or cleaving of wafers, substrates, and plates that might contain passive or active electronic or electrical devices created thereon.

In the process, the filament is forced to curve in a profile to form a facet with a C-shaped in cross-section profile. There is huge demand in the brittle material industry to singulate samples with a C-shaped in cross-section facet profile. The C-shaped in cross-section facet profile is sometimes referred to herein as a C-cut facet profile, a C-shaped (curved) facet profile, a C-shaped facet path, a C-cut facet or just a C-cut.

Singulation of a wafer, substrate or plate having a C-cut facet profile is performed in a single scan.

In current manufacturing, the singulation, dicing, scribing, cleaving, cutting, and facet treatment of wafers or glass panels is a critical processing step that typically relies on diamond or conventional, ablative or breakdown (stealth) laser scribing and cutting, with speeds of up to 30 cm/sec for displays as an example.

In the diamond cutting process, after diamond cutting is performed, a mechanical roller applies stress to propagate cracks that cleave the sample. This process creates poor quality edges, microcracks, wide kerf width, and substantial debris that are major disadvantages in the lifetime, efficiency, quality, and reliability of the product. The sharp edges on the top and bottom surfaces are the source of potential chipping and crack development that can cause material to break apart into pieces during transportation. Generally edges are ground to remove any sharpness and this process is known as the C chamfer grinding process or step. The C chamfer grinding step is an extra processing step which necessitates additional cleaning and polishing steps. The process uses de-ionized water to run the diamond scribers and grinders and the technique is not environmentally friendly since the water becomes contaminated and requires filtration. Grinders and water refining and filtration systems also occupy valuable manufacturing space.

Laser ablative machining has been developed for singulation, dicing, scribing, cleaving, cutting, and facet treatment, to overcome some of the limitations associated with diamond cutting. Unfortunately, known laser processing methods have disadvantages, particularly in transparent materials, such as slow processing speed, generation of cracks, contamination by ablation debris, and moderated sized kerf width. Furthermore, thermal transport during the laser interaction can lead to large regions of collateral thermal damage (i.e. heat affected zones).

Laser ablation processes can be improved by selecting lasers with wavelengths that are strongly absorbed by the medium (for example, deep UV excimer lasers or far-infrared $CO_2$ laser). However, the aforementioned disadvantages cannot be eliminated due to the aggressive interactions inherent in this physical ablation process. This is amply demonstrated by the failings of UV processing in certain LED applications where damage has driven the industry to focus on traditional scribe and break followed by etch to remove the damaged zones left over from the ablative scribe or the diamond scribe tool, depending upon the particular work-around technology employed.

Alternatively, laser ablation can also be improved at the surface of transparent media by reducing the duration of the laser pulse. This is especially advantageous for lasers that are transparent inside the processing medium. When focused onto or inside transparent materials, the high laser intensity induces nonlinear absorption effects to provide a dynamic opacity that can be controlled to accurately deposit appropriate laser energy into a small volume of the material as defined by the focal volume. The short duration of the pulse offers several further advantages over longer duration laser pulses such as eliminating plasma creation and therefor plasma reflections thereby reducing collateral damage through the small component of thermal diffusion and other heat transport effects during the much shorter time scale of such laser pulses.

Femtosecond and picosecond laser ablation therefore offer significant benefits in machining of both opaque and transparent materials. However, in general, the machining of transparent materials with pulses even as short as tens to hundreds of femtoseconds is also associated with the formation of rough surfaces, slow throughput and micro-cracks in the vicinity of laser-formed kerf, hole or trench that is especially problematic for brittle materials like alumina ($Al_2O_3$), glasses, doped dielectrics and optical crystals. Further, ablation debris will contaminate the nearby sample and surrounding devices and surfaces. Recently, multi-pass stealth dicing has been disclosed. In this approach each scan creates voids of about 50 μm long and by rotation of the incident beam and changing the focus of the laser, multiple facet C-cuts are performed. This approach suffers from the need to make multiple passes and precise rotation of the laser head and focus changes for each C-cut and therefore results in low processing throughput.

Short duration laser pulses generally offer the benefit of being able to propagate efficiently inside transparent materials, and locally induce modification inside the bulk by nonlinear absorption processes at the focal position of a lens. However, the propagation of ultrafast laser pulses (>5 MW peak power) in transparent optical media is complicated by the strong reshaping of the spatial and temporal profile of the laser pulse through a combined action of linear and nonlinear effects such as group-velocity dispersion (GVD), linear diffraction, self-phase modulation (SPM), self-focusing, multiphoton/tunnel ionization (MPI/TI) of electrons from the valence band to the conduction band, plasma defocusing, and self-steepening.

These effects play out to varying degrees that depend on the laser parameters, material nonlinear properties, and the focusing condition into the material.

Although laser filamentation processing has been successful in overcoming many of the limitations associated with diamond cutting, as mentioned above, new demands for chamfer C cutting encouraged invention of new methods and structure to successfully implement filamentation photoacoustic compression scribing using curved filaments.

SUMMARY OF THE INVENTION

Systems and methods are described for forming continuous laser curved filaments in transparent materials. A burst of ultrafast laser pulses or single laser pulse is propagated via a custom optics cubic phase plate or mask to gain extensive cubic phase then focused such that a beam waist is formed external to the material being processed, such that a primary geometrical focus does not form within the material, while a sufficient energy density is formed within an extended region within the material to support the formation of a continuous filament, without causing optical breakdown within the material. An intense laser that gains extensive cubic phase transforms to an Airy beam in far field. Propagation of an Airy beam is first demonstrated by Siviloglou (Phys. Rev. Lett. 99, 213901 2007) applying spatial light modulator. An Airy beam tends to propagate in a parabolic trajectory. As discussed by Papazoglou (Phes. Rev. A 81, 061807(R), 2010) it is possible to gain cubic phase via coma aberration which is the nature of the lenses if they intercept the beam at an angle. A spatial light modulator generally damage if an intense laser is used and angled lens generally lose a lot of laser power. Since a limited region of curved filament is desired it is preferable to use a fixed cubic phase plate or mask to introduce sufficient phase causing the beam to curve in the focus region. This creates a curved filamentation inside the transparent material that assists in singulation. As such, the facet is curved.

As stated above, curved facets are known as C-cuts. The C-shaped in cross-section facet profile is sometimes referred to herein as a C-cut facet profile, a C-shaped (curved) facet profile, a C-shaped facet path, a C-cut facet or just a C-cut.

C-cut facets enhance bending strength and avoid formation of chips or cracks. The prior art uses additional manufacturing steps such as mechanical grinding to achieve C-cut facets.

Filaments formed according to this method may exhibit lengths exceeding up to 10 mm with a 1:1 correspondence in the length of the modified zone (in that the filament is the agent of modification, so the modified zone tracks 1:1 with the extent of the filament) and a taper-free profile when viewed with the long axis in cross-section. In some embodiments, an uncorrected or aberrated optical focusing element is employed to produce an external beam waist while producing C-shaped filaments, for example, a curved distributed focusing of the incident beam within the material. Various systems are described that facilitate the formation of C-shaped curved filament arrays within transparent substrates for cleaving/singulation. Optical monitoring of the filaments may be employed to provide feedback to facilitate active control of the process.

Accordingly, in a first aspect, there is provided a method of laser processing a transparent material, the method comprising:

providing a laser beam comprising a burst of laser pulses or single laser pulse;

providing a cubic phase mask in the beam path to induce cubic phase in the laser pulses;

externally focusing the laser beam relative to the transparent material to form a beam waist at a location that is external to the transparent material;

wherein the laser pulses are focused such that a sufficient energy density is maintained within the transparent material to form a continuous laser C-shaped curved filament therein without causing optical breakdown.

In another aspect, there is provided a method of processing a transparent material, comprising the steps of:

providing a laser beam, said laser beam having a plurality of bursts and each of said bursts include a plurality of pulses;

generating an initial waist of said laser beam outside (external to) said transparent material;

generating a weakly focused laser beam distributed within said transparent material in a C-shaped curved path; and, producing a spatially extended and spatially homogenous C-shaped curved filament in said transparent material.

In another aspect, there is provided a method of processing a transparent material, said transparent material has a metal layer formed within or on a surface thereof, the laser beam is a filament-forming laser beam, comprising the steps of:

prior to forming the continuous laser filament within the transparent material;

providing a low-power laser beam comprising a burst of laser pulses or single laser pulse by reducing the power of the filament-forming laser beam below the threshold for the formation of a filament within the transparent material, while maintaining sufficient power to ablate the metal layer; and irradiating the metal layer with the low-power laser beam at one or more locations such that the metal layer is locally ablated by the laser beam thereby producing one or more ablative markings within the metal layer.

In another aspect, there is provided a transparent material having a continuous laser C-shaped curved filament formed therein, the continuous laser filament having a length exceeding approximately 1 mm.

In another aspect, there is provided a transparent substrate exhibiting a post-cleave or post-singulation break strength that exceeds approximately 200 MPa.

In another aspect, there is provided a system for laser processing a transparent material, the system comprising:

a laser source configured to provide a laser beam comprising bursts of laser pulses;

a laser source configured to provide a laser beam comprising a single pulse;

one or more focusing elements configured to externally focus the laser beam relative to the transparent material to form a beam waist at a location that is external to the transparent material wherein the laser beam and the one or more focusing elements are configured to produce a sufficient energy density within the transparent material to form a continuous laser filament therein without causing optical breakdown in a C-shaped curved profile;

means for varying a relative position between the laser beam and the transparent material; and, a control and processing unit operatively coupled to the means for varying the relative position between the laser beam and the transparent material, wherein the control and processing unit is configured to control the relative position between the laser beam and the transparent material for the formation of an array of continuous laser filaments within the transparent material.

A further understanding of the functional and advantageous aspects of the disclosure can be realized by reference to the following detailed description and drawings.

BRIEF DESCRIPTION OF THE DRAWINGS

Embodiments of the disclosure will now be described, by way of example only, with reference to the drawings, in which:

FIGS. 1A and 1B illustrate the formation of filaments using previously known methods involving the formation of a beam waist within the material.

FIGS. 1C-1E illustrate various embodiments in which long homogeneous filaments are formed by focusing the beam energy such that it is "dumped" into a focus above and/or below the target material (forming an "optical reservoir") in order to modulate the amount of energy passed into the desired filament zone.

FIG. 6A is a side view of the workpiece illustrating a C-shaped filament therein. The structure of FIGS. 6A, 6B and 6C enables the production of parts with C-shaped edges. For example, using the theta stage, a circular path can be traced producing a part as shown in FIG. 6C with a cut-out having a C-cut edge. FIG. 6B is a perspective view of the workpiece illustrated in FIG. 6A. FIG. 6C illustrates a part cut from the workpiece illustrated in FIGS. 6A and 6B with a circularly extending C-shaped edge.

FIG. 7D provides an example implementation of such an embodiment, showing a glass part processed via filament formation to exhibit a rounded edge.

DETAILED DESCRIPTION OF THE INVENTION

Figure 1A:
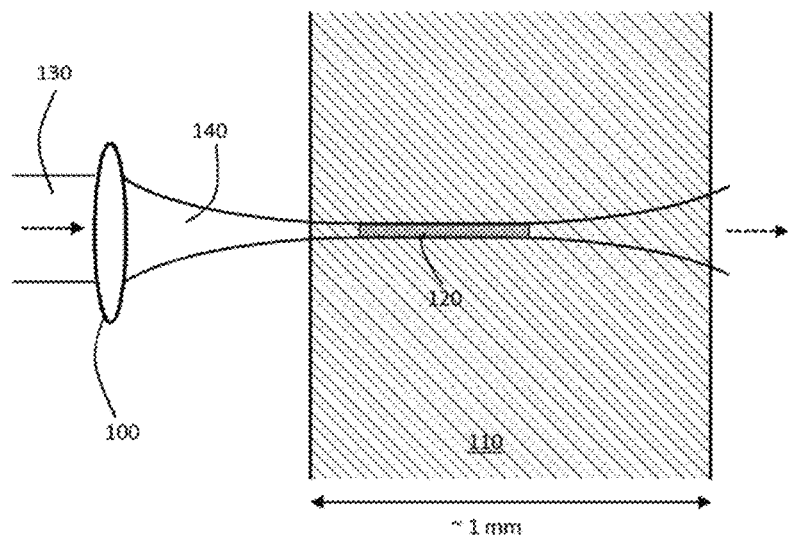
FIGS. 1A-E illustrate various optical configurations for the formation of filaments.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

Unless defined otherwise, all technical and scientific terms used herein are intended to have the same meaning as commonly understood to one of ordinary skill in the art. Unless otherwise indicated, such as through context, as used herein, the following terms are intended to have the following meanings.

As used herein, the term "filament modified zone" refers to a filament region within a substrate characterized by a region of compression defined by the optical beam path.

As used herein, the phrases "burst", "burst mode", or "burst pulses" refer to a collection of laser pulses having a relative temporal spacing that is substantially smaller than the repetition period of the laser. It is to be understood that the temporal spacing between pulses within a burst may be constant or variable and that the amplitude of pulses within a burst may be variable, for example, for the purpose of creating optimized or pre-determined filament modified zones within the target material. In some embodiments, a burst of pulses may be formed with variations in the intensities or energies of the pulses making up the burst.

As used herein, the term "transparent" refers to a material having an absorption spectrum and thickness such that at least a portion of the incident beam is transmitted in the linear absorption regime. For example, a transparent material may have a linear absorption spectrum, within a bandwidth of the incident beam, and a thickness, such that the percentage of light transmitted through the material is greater than 10%, greater than 25%, greater than 50%, greater than 75%, greater than 80%, greater than 85%, greater than 90%, greater than 95%, greater than 98%, or greater than 99%, as the case may be.

As used herein, the phrase "geometric focus" refers to the calculated or estimated focus produced by an optical focusing lens or assembly, where the calculation is made without incorporating or considering nonlinear effects within the material being processed (e.g. with a beam waist position determined according to the simple lens equation). This phrase is used to distinguish between the expected location of the optical focus based on the position of the lenses, and the optical constriction events created within the material being processed that are caused by non-linear beam refocusing, which provides, in effect, a quasi-Rayleigh length on the order of up to approximately 10 mm.

As used herein, the term "photoacoustic drilling" refers to a method of machining a target (generally by cutting or drilling of a substrate from a solid by irradiating it with a lower pulse energy light beam than is used in ablative drilling or cutting techniques. Through the processes of optical absorption followed by thermoelastic expansion, broadband acoustic waves are generated within the irradiated material to form a pathway of compressed material about the beam propagation axis (common with the axis of the orifice) therein that is characterized by a smooth wall orifice, a minimized or eliminated eject a and minimized micro crack formation in the material.

Airy beam refers to a laser pulses that are propagated through a spatial light modulator, combination of angled lenses or phase plate to gain a substantially cubic phase. An airy beam pulse is a special kind of pulse with cubic phase that does not diffract and propagate in a parabolic arc trajectory in the far field. Using a single lens applies a Fourier transform to the pulse and changes the arc trajectory formation to the near field (geometrical focus of the lens).

A Bessel beam is a non-diffractive beam that can be generated using an axicon. It has a long depth of focus ideal to elongate the focus to guide the intense ultrafast beam towards filamentation.

An Airy-Bessel beam refers to pulses that have a substantial cubic phase that focuses using axicon to form an elongated curved focuses.

The main objective of the present invention is to provide fast, reliable and economical non-ablative laser machining to initiate orifices (stopped/blind or through orifices) in the target material that may be initiated below or above a single or multiple stacked target material by curved filamentation by a burst(s) of ultrafast laser pulses. Ultra short lasers offer high intensity to micromachine, to modify and to process surfaces cleanly by aggressively driving multi-photon, tunnel ionization, and electron-avalanche processes. The issue at hand is how to put enough energy in the transparent material of the target, less than that used in ablative drilling, but beyond the critical energy level to initiate and maintain photoacoustic compression so as to create a filament that modifies the index of refraction at the focal points in the material and does not encounter optical breakdown (as encountered by the prior art ablative drilling systems) such that continued refocusing of the laser beam in the target material can continue over long distances, enough so that even multiple stacked substrates can be drilled simultaneously with negligible taper over the drilled distance, a relatively smooth orifice wall and can initiate from above, below or within the target material all in a curved configuration as such after cleaving the sample facet having a C-shaped in cross-section profile.

Laser Filamentation

Laser filaments can be formed in transparent materials using ultrafast laser pulses that are focused within the material. For example, as taught in Patent Cooperation Treaty Application No. PCT/CA2011/050427, titled "Method of Material Processing by Laser Filamentation", filaments can be formed by focusing, with an objective lens, a burst-train of short duration laser pulses inside a transparent substrate. The burst of laser pulses produces internal microstructural modification with a shape defined by the laser filament volume. By moving the sample relative to the laser beam during pulsed laser exposure, a continuous trace of filament tracks is permanently inscribed into the glass volume as defined by the curvilinear or straight path followed by the laser in the sample.

As noted in PCT Application No. PCT/CA2011/050427, it is believed that filaments (also referred to as "plasma channels") are produced by the weak focusing of laser pulses having a high intensity and short duration, such that the pulses can self-focus by the nonlinear Kerr effect due to the formation of a plasma. This high spatio-temporal localization of the light field can deposit laser energy in a long and narrow channel, while also being associated with other complex nonlinear propagation effects such as white light generation and formation of dynamic ring radiation structures surrounding this localized radiation. PCT Application No. PCT/CA2011/050427 teaches that laser filaments may be formed over length scales on the order of hundreds of microns by focusing the laser beam such that the focal point (e.g. initial beam waist) lies within the material.

In contrast to known filament forming methods, the present disclosure provides methods for forming spatially extended and spatially homogeneous curved filaments in transparent materials. According to one embodiment, a burst of ultrafast laser pulses is focused such that an external beam waist is formed outside the target material and weak distributed focusing of the incident beam occurs within the target material in an arc configuration, thereby forming a high density electric field within the material and creating a zone of compression along the incident path of the laser. This zone of compression results in a phase change (confirmed by etch rate experiments) in a narrow curtain of material extending uniformly and radially from the center of the propagation axis.

As described further below, the length and position of the filament is readily controlled, for example, by the positioning of the focusing apparatus, the cubic phase plate or mask, the numerical aperture of one or more focusing elements, the laser pulse energy, wavelength, duration and repetition rate, the number of laser pulses and bursts applied to form each filament track, and the optical and thermo-physical properties of the transparent medium. Collectively, these exposure conditions (power, repetition rate, translation speed and the degree to which the wavefronts has been distributed/aberrated to extend the interaction zone) can be manipulated to create sufficiently long and intense filaments to extend or nearly extend over the full thickness of the processed material.

Accordingly, embodiments disclosed herein harness short duration bursts of laser pulses (preferably with a pulse duration less than about 100 ps) to generate a filament inside a transparent medium. The method avoids plasma generation such as through optical breakdown that can be easily produced in tight optical focusing conditions as typically applied and used in femtosecond laser machining (for example, as disclosed by Yoshino et al., "Micromachining with a High repetition Rate Femtosecond Fiber Laser" (2008), Journal of Laser Micro/Nanoengineering Vol. 3, No. 3 pgs. 157-162).

In the weak and distributed focusing embodiments disclosed herein, the nonlinear Kerr effect is believed to create an extended laser interaction focal volume that exceeds the conventional depth of field, overcoming the optical diffraction that normally diverges the beam from the small self-focused beam waist. It is in this so-called filament zone, formed via distributed or extended focusing, that the material undergoes a phase transition induced by photo-acoustic compression, in a substantially symmetrical, substantially curved cylindrical region centered about the axis of beam propagation in the material.

This modification requires energy densities above a certain characteristic threshold for each material, ideally chosen by the highest threshold of the materials present in a non-homogeneous complex stack. This modification can occur at normal and non-normal angles of incidence relative to the top of the substrate and persist for distances only limited by the power available in the incident beam.

Furthermore, it is believed that optical breakdown does not occur in the material during processing, as this would create discrete damage centers instead of the long continuous and homogenous filament modified zones of the present disclosure. While laser energy deposited along the filaments leads to internal material modification that can be in the form of defects, color centers, stress, microchannels, microvoids, and/or micro cracks—experimental results have shown that the modification is substantially uniform and symmetric in its appearance, with an interior surface that is substantially homogenous in its physical characteristics. This is believed to be achieved by presenting a very high intensity electric field that possesses a very uniform energy distribution along the length of the filament.

Formation of Extended Straight Filaments Via Distributed Focusing of Laser Beam

In contrast to the methods and apparatus disclosed in PCT Application No. PCT/CA2011/050427, the present disclosure provides methods, apparatus and systems for the controlled formation of filaments in transparent materials using an optical focusing configuration in which the incident beam is directed onto the material such that an external waist is formed and such that the beam energy is focused in a distributed manner throughout a region within the material. It is believed that the distributed focusing configuration without the formation of an internal beam waist provides conditions that sustain the formation of the laser filament over longer distances, with more controllable geometries and mechanical properties, as further described below.

Figure 1B:
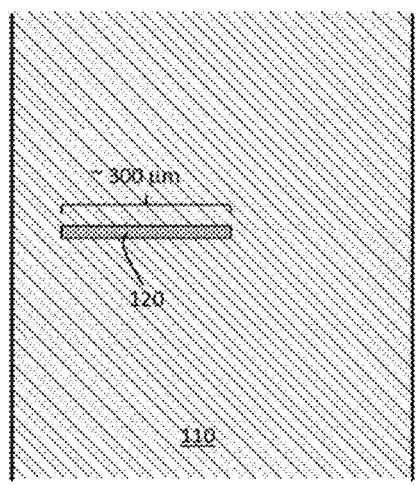

Referring now to FIG. 1A, a focusing arrangement disclosed in PCT/CA2011/050427 is illustrated, in which focusing lens 100 is employed to focus a burst of ultrafast laser pulses within a material 110 for the formation of a filament 120. Focusing lens 100 is positioned relative to material 110 such that the focus of lens 100 is located within material 110. Incident beam 130 is focused by focusing lens 100 to form converging beam 140, which is focused within material 110 and maintains a focused configuration, forming filament 120 prior to expanding and de-focusing. As described above, the confinement of the optical power within material 110, while forming filament 120, is achieved through self-focusing via self-phase modulation. Beam 140 expands beyond the filament forming region due to loss of optical beam power, such that self-phase modulation is no longer sufficient to support self-focusing and to counter the defocusing caused by the presence of the heating and subsequent index change in the target material. As shown in FIG. 1B, this method can result in the formation of a filament 120 within material 110 having a length on the scale of hundreds of microns.

Figure 1C:
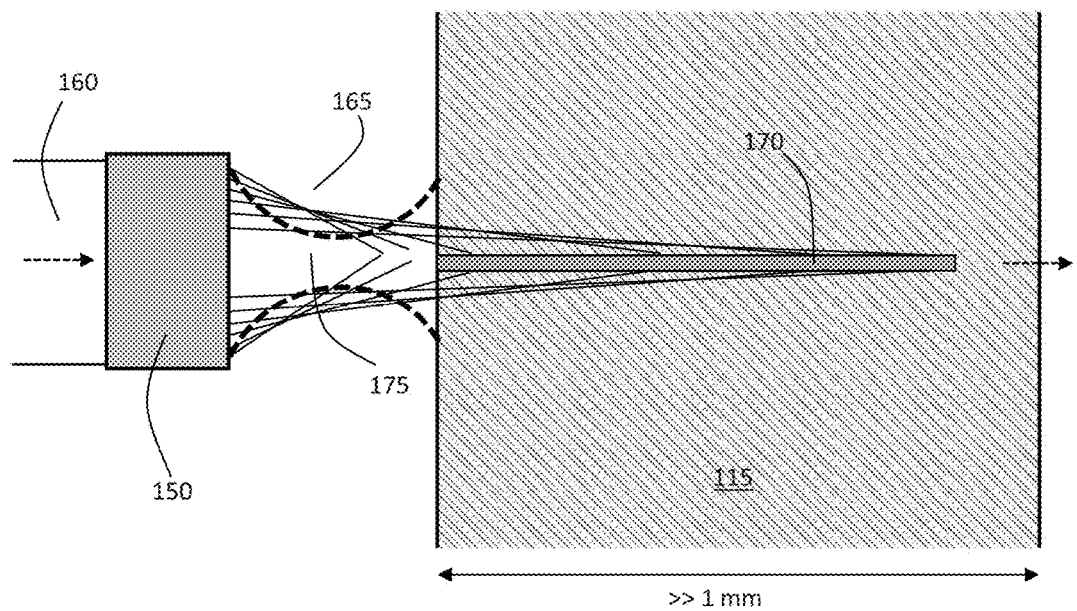

FIG. 1C illustrates an example embodiment of spatially extended filament generation in a transparent material through the distributed focusing of a burst of ultrafast laser pulses. Unlike the configuration shown in FIG. 1A, in which incident beam 130 is focused by focusing lens 100 to form a well-defined initial waist within material 110, the configuration shown in FIG. 1C employs distributed focusing element 150 to focus incident beam 160 such that the resulting converging beam 165 is focused to an initial external waist 175, and is also weakly focused in a distributed manner within material 115. The external formation of the initial waist prevents excessive focusing and optical breakdown within the material, avoiding deleterious effects such as optical breakdown. The distributed focusing configuration causes the focused beam to be directed onto material 115 such that the optical power is extended over a range of locations, unlike known methods in which external focusing produces a narrow external plasma channel, thereby distributing the incident laser within material 115, as opposed to forming a waist within the material with a tight and well-defined location. Such a distributed focusing configuration is capable of producing a filament 170 having controlled geometrical properties and a length on the millimeter scale. Distributed focusing element 150 may include one or more lenses that are formed (e.g. ground or molded) to produce what appears to be a distributed focus (not necessarily an evenly distributed focus), with a waist residing above or in front of the surface of the material, adjacent to a surface of the material, providing a very weakly focused spot at the material surface in the absence of an external plasma channel. In one embodiment, the waist is located at an offset of at least approximately 10 µm from an external surface of the material. In another embodiment, the waist is located at an offset of at least approximately 20 µm from an external surface of the material. In another embodiment, the waist is located at an offset of at least 50 µm from an external surface of the material. Accordingly, the present embodiment avoids the need to form a primary beam waist within the material by altering the focal properties of the lenses, offering a wide range of processing options, such that an external waist is formed above, below or, for example, in between layers of target materials in an interstitial space.

Without intending to be limited by theory, it is believed the distributed focusing configuration of the present disclosure produces longer filaments due to the spatial replenishment of the optical beam power from the additional focal regions. As optical power within the narrow filament forming region is initially depleted during beam propagation, through interaction with the complex (non-linear) index changes formed via the nonlinear processes, additional optical power is provided by the distributed focusing of the beam along its length, such that the beam can propagate further in a self-focused manner while forming the filament, prior to defocusing. As noted above, in some embodiments this approach produces the desired self-focusing and compression without actually forming plasma.

Referring again to FIG. 1C, the illustrated example embodiment is shown with focusing element 150 positioned such that a least a portion of the converging beam 165 is focused in front of material 115, for example at location 175 in FIG. 1C. In particular, in the example implementation shown, the high numerical aperture rays encountering distributed focusing element 150 are focused in front of material 115. By focusing a portion of the incident optical power in front of material 115, the intensity profile formed immediately within the material is not too high or too low, which therefore allows the formation of a filament having a substantially uniform cross section over its length.

As noted above, the advantage of creating a beam waist above or in front of the material, instead of below, lies in the desire to avoid exceeding the optical breakdown threshold of the material. It also enables a larger process window by giving the user more options relative to process set-up and sample configuration.

Figure 1D:
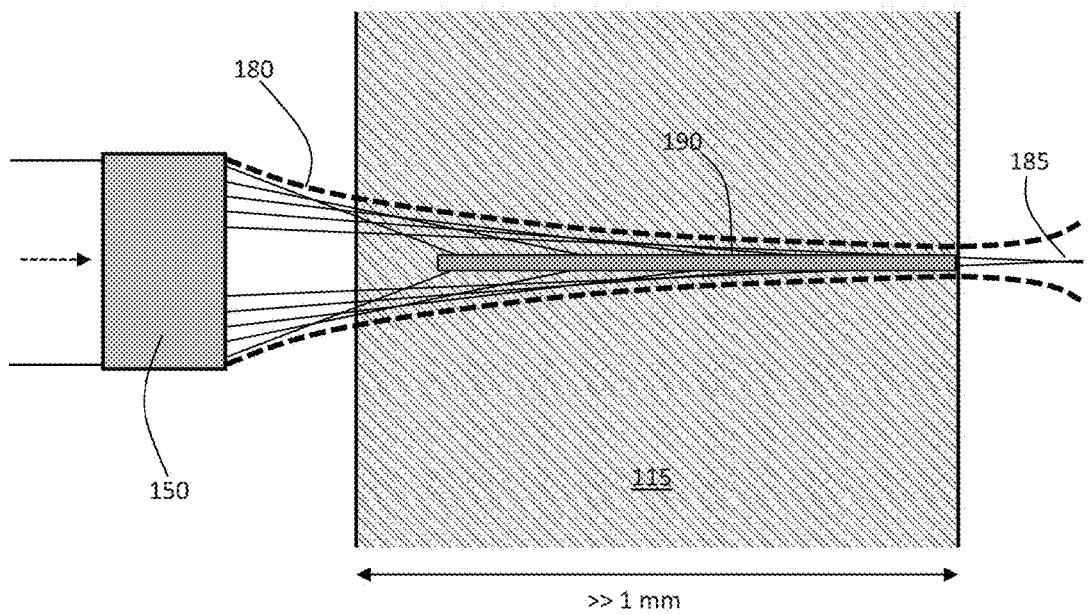
Figure 1E:
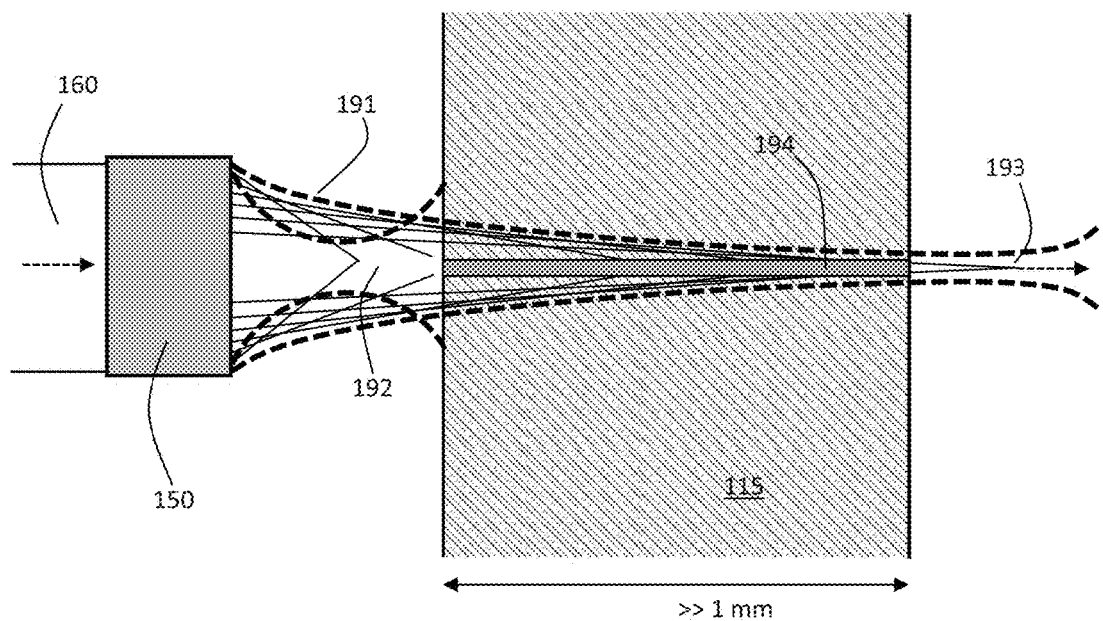

FIG. 1D illustrates an alternative example embodiment in which distributed focusing element 150 is positioned such that a portion of converging beam 180 is focused behind material 115 at location 185 for forming filament 190. Referring now to FIG. 1E, another example embodiment is illustrated in which distributed focusing element 150 is positioned such that a portion of converging beam 191 is focused in front of material 115 (e.g. at location 192), and another portion of converging beam 191 is focused behind material 115 (e.g. at location 193), for forming filament 194. In this configuration, a greater length and still maintain enough energy along the path through the target to create acoustic compression from the electric field induced heating effects formed by the laser. This embodiment may be employed to enable a higher degree of control and depth in forming filaments. As shown in FIG. 1D, such an embodiment may be useful in forming filaments throughout the material, through transparent substrates with thicknesses of millimeters to tens of millimeters.

Figure 1F:
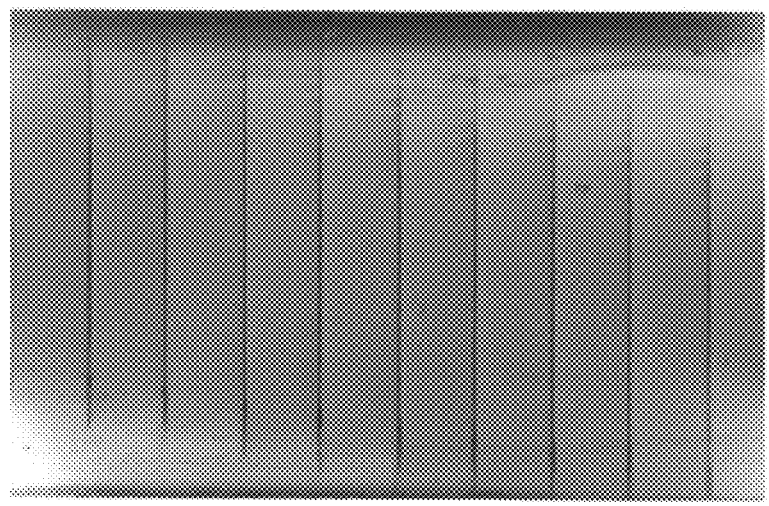
FIG. 1F is an example image of filaments formed according to the methods disclosed herein, demonstrating the formation of a spatially extended filament with a homogeneous and continuous profile, where the depth and location of the filament within the material is determined by the relative positioning of the beam focus (each filament corresponds to a vertical offset of 25 microns).

The benefit of the distributed focusing configuration employed in methods disclosed herein can be understood as follows. If the incident beam is focused to a waist within the material, the filament progression stops after a short distance, as in the previously known methods. However, if the incident power is focused outside of the material, forming an optical reservoir, and the material is allowed to act as the final lens as it undergoes thermally induced changes in the index (complex index in particular), then the filament can be formed with a substantially homogeneous cross sectional profile, and spatially extended over millimeters in length, as illustrated in FIG. 1F, which demonstrates the formation of homogeneous filaments with lengths exceeding 1 mm in soda lime glass. FIG. 1F further illustrates the control of relative vertical positioning of the filaments by varying the axial position of the beam focus (each filament corresponds to an offset of 25 microns). Such processing can produce high quality edges which are substantially absent of large chips. (for example, chips >10 µm).

Figure 1G:
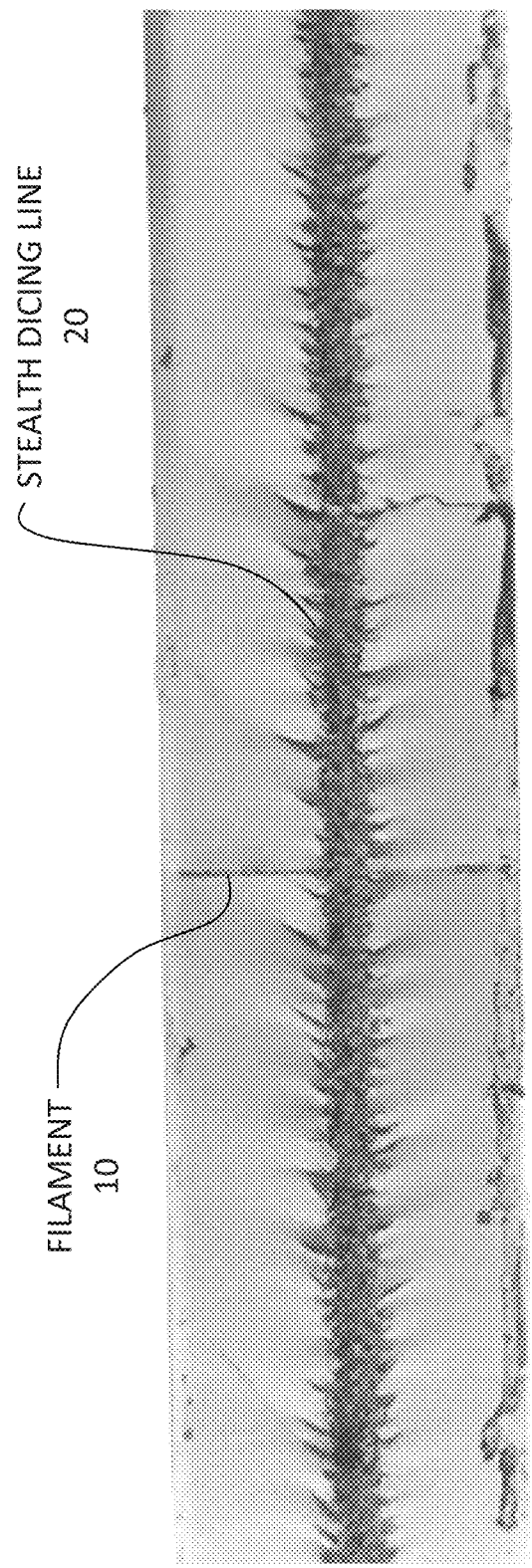
FIG. 1G is a microscope image of a glass sample illustrating the difference between the stealth dicing and filamentation processing methods.

FIG. 1G is a microscopic image of a glass substrate processed and cleaved according to the stealth dicing method. A filament array had also been formed in a direction perpendicular to the stealth dicing line (the sample shown had not yet been cleaved according to the filament array line). As shown in FIG. 1G stealth dicing line 20 shows the telltale signs of optical breakdown, which produces a very smooth top edge, but a very rough face overall. The roughness of the faced edge obtained by cleaving along the stealth dicing line was found to be 53 microns in the vertical direction and 85 microns in the horizontal direction. In contrast, filament 10 illustrates a continuous material modification extending through the substrate, facilitating cleavage that results in a smoother facet. As described below, the cleavage of the sample along the filament array line can produce surface roughness values on the order of 1 to 10 microns for glass materials.

As described in further detail below, the filaments formed according to the methods disclosed herein can be formed with a length that is much longer than previously reported filaments. Furthermore, the present methods can be employed to produce filaments that are continuous, radially symmetric and uniform in dimension. A key consideration for the formation of extended filaments within the transparent material is the supply of the requisite fluence, treated below, while at the same time avoiding the optical breakdown threshold of the material. It has been found that the filament length is tied into the total energy supplied to the material and the material's linear absorption.

For example, filaments 3 mm long can be formed in borosilicate glass using the following conditions: an average power of approximately 50 W; a wavelength of 1064 nm; a pulse width of less than approximately 50 picoseconds; a burst profile of approximately 5 pulses, a pulse profile decreasing in amplitude, increasing in amplitude, and/or level in amplitude; and a spot size of approximately 10 µm.

The position of the stop and start of the filament can be controlled by selecting the position of the geometric focus, or beam waist, as predicted by the geometrics of the lens group or focusing assembly. The balance between power and size, also explained below, provides the ability to avoid the formation of a beam waist within the material.

Figure 2A:
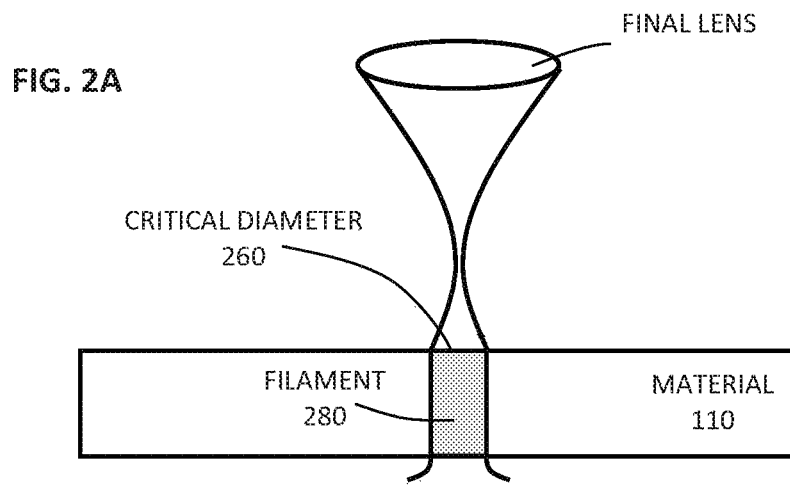
FIG. 2A depicts a long filament zone on the scales of millimeters to tens of millimeters.
Figure 2B:
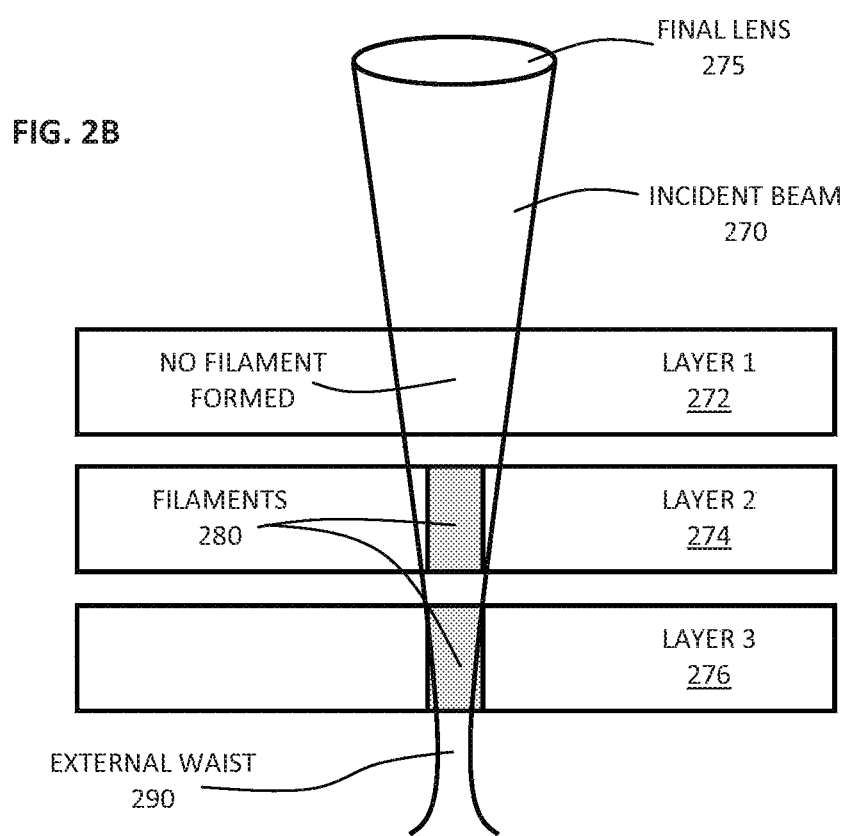
FIG. 2B illustrates the ability for the beam to pass through intermediate layers without damaging them.

FIGS. 2A and 2B show the flexibility can be achieved by controlling the location of the beam waist focus. FIG. 2A depicts a long filament zone 280 on the scales of millimeters to tens of millimeters (not to scale; filaments of up to 10 mm have been produced by the inventor). The ability for the beam to pass through layers without damaging them is illustrated. The critical diameter range 260 (which may vary, for example, accordingly for each material, focusing conditions, and laser power) is also indicated, which is defined as the range of laser spot diameters above which filaments do not form and below which optical damage occurs. In one example implementation, the critical diameter range for soda lime glass has been found to lie near 8 µm. The critical ratio is also noted, which equals the ratio of the diameter of the incident laser spot on the material to the diameter of the filament. For example, in one example range, the critical ratio may vary between approximately 0.01 and 1000; in another example range, the critical ratio may vary between approximately 0.01 and 10, in another example range, the critical ratio may vary between approximately 10 and 50, in another example range, the critical ratio may vary between approximately 50 and 500, and in another example range, the critical ratio may vary between approximately 1 and 1000.

As shown in FIG. 2B, the incident beam 270, focused by final lens 275, can be made to pass through one or more substantially transparent layers 272 above the desired target location of the filament zone, without forming either a focus or any filaments, with an external waist 290 that is formed beyond the final layer 276. Filaments 280, 280 then form within one or both layers 274, 276 and not in transparent layer 272 (as a result of the critical (requisite) fluence not being achieved in layer 272) Critical fluence is achieved in layers 274, 276 as illustrated in FIG. 2B along the incident path through the target stack.

In order to control the fluence in the incident beam, the power contained within the beam diameter at the surface of the material can be altered, programmed in fact, by varying the size of the beam diameter. In particular, there is a correlation between the transparent material, the critical (required) fluence (power) and filament formation efficacy.

In one example implementation, the properties of the filaments can be controlled by varying the first incident fluence (the fluence on the first incident surface) and the energy contained within each sub pulse. It will be understood that in embodiments involving multiple surfaces upon which the laser is incident (described further below), each surface will have its own fluence, and each fluence will depend upon the first incident fluence due to absorption and scattering.

It has been found that an incident spot size of approximately 100 µm leads to filaments with a diameter of 2.5 µm and a length of several mm. Some characteristics of the filament can be controlled by changing the pulse energy and spot size ratio. Different materials have different propensities toward extended filament formation.

In order for the filament to create a continuous and substantially uniform channel, the energy intensity must also be such that once deposited, the burst pulse induced intensity, refreshed at the burst pulse frequency rate, is capable of forming a shock wave of the requisite intensity to radially compress the material. Once this phase change occurs (or in certain materials, simply a density change), the filament zone functions as a cleavage plane, either immediately, after some programmable delay or via the application of a subsequent cleavage step. A suitable energy can be empirically determined for a given material by producing filaments at various beam energies, observing or measuring the filament depth, and selecting a beam energy that produces filaments of a suitable length. In one non-limiting example implementation, the energy in the incident beam (the energy of all pulses in a burst) may be between approximately 10 µJ and approximately 2000 µJ.

It will be understood that a wide range of laser beam parameters may be varied to obtain filaments with different characteristics and properties. Furthermore, the beam parameters suitable for forming a filament with a given set of properties will vary among different materials. The present disclosure provides some example ranges of beam parameters that may be employed to form filaments in some selected materials. Such example ranges are not intended to be limiting, and it will be understood that other ranges may be suitable for forming filaments with other properties in the example materials, or in other materials.

It is to be understood that the burst repetition rate, together with the translation speed of the material relative to the incident beam, defines the spacing between neighboring filaments. In one non-limiting example, this range may be from approximately 1 kHz to approximately 2 MHz.

As shown in FIGS. 1C to 1E, the incident beam is focused such that the focal volume is distributed over an extended region within the sample. The distributed focal volume may be sufficiently longer than the Rayleigh range obtained from a non-distributed focusing element having a similar or equivalent numerical aperture. For example, the focal region under distributed focusing may be 20%, 30%, 50%, 100%, 200%, 500%, 1000% or greater than the corresponding Rayleigh range obtained without distributed focusing.

The distributed focal volume may be sufficiently long that the filament formed by the beam under distributed focusing conditions is significantly longer than the filament that would be formed from a non-distributed focusing element having a similar or equivalent numerical aperture. For example, the filament formed under distributed focusing may be 20%, 30%, 50%, 100%, 200%, 500%, 1000% or greater than the corresponding filament formed without distributed focusing.

It is to be understood that the distributed focal assembly may include one or more optical components/elements, such as an optical train including two or more optical components. In one embodiment, the distributed focal assembly is configured to focus the optical beam in a non-distributed manner in one lateral dimension, and to focus the beam in a distributed manner in the other lateral dimension.

With appropriate beam focusing, manipulating the focal length or beam expansion ratio, for instance, laser filaments can terminate and cause the laser beam to exit the glass bottom surface at high divergence angle such that laser machining or damage is avoided at the bottom surface of the transparent plate. It is also possible to create filaments in the middle of a multi-sheet stack, without inducing damage in the sheets located above and below the target sheet, but while damaging the top and bottom surface of the target sheet, as described further below.

In some embodiments, the long filament length may be created by a combination of negative and positive lenses that optimize the filling of the apertures on each optical element, maintaining high power efficiency within the optical train and maintains laser intensity to radially compress the target material as has been previously described.

Example Distributed Focusing Element: Aberrated Element

In some embodiments, the distributed focal assembly may include one or more optical components configured to induce aberrations in the focused optical beam, such that the focused optical beam is focused in a distributed manner over a longitudinal focal volume without forming a waist within the material.

One or more optical components may include spherical aberration. In some embodiments, the distributed focal assembly may include one or more aberrated optical components, and one or more substantially non-aberrated optical components. In some embodiments, aberrations are induced by the distributed focal assembly in one dimension. In other embodiments, aberrations are induced by the distributed focal assembly in two dimensions.

Long filaments can be created by the use of an aberrated optical assembly (one or more aberrated optical elements) such that a long series of quasi-focal points can be achieved, even though no beam-waist forms within the material due to the distortion wrought by the target itself and the electric field heating created along the incident axis. Creating a large spot with >1 µm diameter and creating at least one external beam waist (a "reservoir region"), in front of the target material and/or behind it (as illustrated in FIGS. 1C-1E, enables "dumping" energy into focal spots outside the target material or layer, where a beam waist is formed in the air without forming a plasma channel in the air, and no ablative work is accomplished.

The present embodiment provides a beam path with non-uniform distribution of energy outside of the material, while also forming a uniform beam path contained within the target material that produces a filament containing no beam waist along its length.

Using one or more aberrated elements, one can choose to distribute the energy in such a fashion as to avoid the beam waist event within the material and yet create a uniform filament and "dump" the extra energy into one, two or more external waist regions, without forming an external plasma channel, in order to maintaining the required fluence to promote filament formation, long uniform modification and avoid optical breakdown. In other words, the strong focus of the one or more aberrated elements may be employed to act as an external beam dump, and the remaining rays may be employed to create a strong burst pulse filament within the material.

The aberration of an optical focusing component, assembly, or system may be measured in waves (or fractions thereof, related to the wavelength of light being used). For example, the aberration may be specified according to the ratio of waves not arriving at the same spatial point (or volume) as defined by the ideal lens to the ratio of waves arriving at the same point. In some non-limiting example implementations, the aberration in the optical focusing assembly may be greater than approximately 0.1% aberration and less than approximately 80% aberration.

The nature of the aberration can be variable provided the energy density at the first incident surface stays above that required to form filaments and below the optical breakdown threshold for the target material. In one particular example, the optical elements can be formed such that two primary foci form, separated by at least a distance corresponding to the thickness of the target material(s) or layer(s). See, for example, FIG. 1E.

Burst Pulse Characteristics

It has been found that the use of burst pulses in a distributed focusing configuration supports the formation of long filaments (such as, but not limited to, filaments having a length >15% of the total target material thickness, for example, in glass applications, a length >100 µm and up to >10 mm), with homogenous properties (for example, filaments having substantially the same diameter over a substantial length thereof, and substantially the same diameter at the entrance and exit faces of the material for filaments that traverse the material thickness). It is possible to make a filament using a single pulse but the effect of heat accumulation using a burst of laser pulses is outstanding. Similarly, material scribing that can be done with 40 W ps laser would need at least 60 W if a single pulse regime is used. Importantly, a 40 W scribed line using burst pulses will cleave much easier than a 60 W scribed line using a single pulse both scribed at the same speed. The distributed focusing of a burst of pulses also supports the formation of smooth surfaces after cleaving along a filament array. For example, the beam and focusing conditions disclosed herein have been employed to provide segmented samples with cut face surface roughness (Ra) that is less than approximately 10 µm, and sometimes as low as 200 nm, or less. Such filaments can be formed in brittle materials.

Figure 3A:
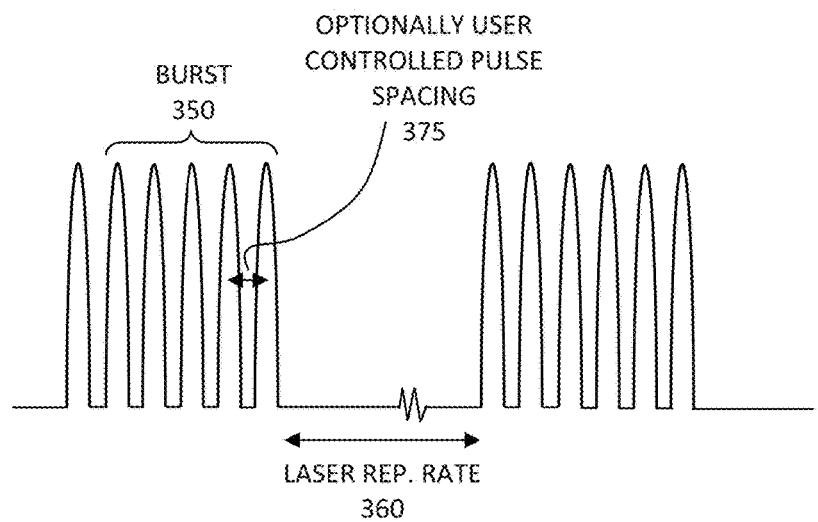
FIGS. 3A-3E illustrate the characteristics of an example burst pulse train. In some embodiments the spacing between the sub-pulses and the burst packets can be controlled, and the number of pulses in the burst pulse train can be controlled.
Figure 3B:
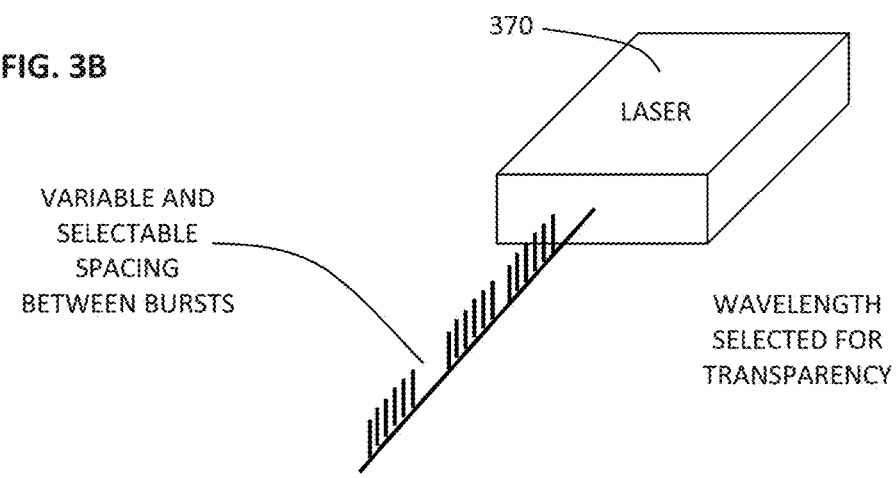

FIGS. 3A-3E illustrate multiple embodiments showing the temporal nature of the burst pulses 350 and the degree of control the laser source can provide on the timing and sequencing of the pulse. FIGS. 3A and 3B illustrates the optional control over burst repetition rate 360 and inter-pulse temporal spacing 375. For example, the timing between the pulses can be controlled by manipulating the EO switch timing, to create various multiples of the main oscillator signal, generating the variable pulse timing. FIG. 3B is an example illustration showing the degree of variability over which the pulses can be delivered and a schematic of the pulses being generated within the laser head 370. It is to be understood that in some embodiments, the pulses could be modulated along the optical train, for example, by inclusion of an optical switch or electro-optical switch to develop user selectable pulse (and or pulse envelopes) profiles (rising or falling or equal), changing the amplitude of the energy in the pulse (and/or pulse envelopes) and deciding to what degree it is divided among smaller burst pulses where the total number of pulses is user selectable.

Figure 3C:
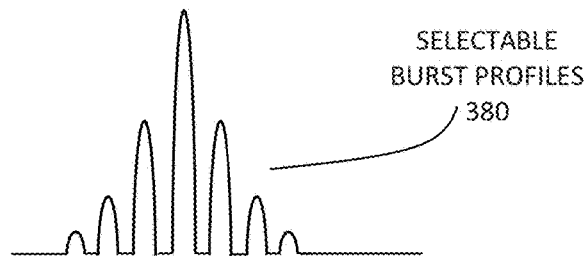

As shown in FIG. 3C, the user/operator may manipulate the pulse profile 380 to control the process based on the desired material properties of the parts generated in a system equipped with such a laser and associated optics.

Figure 3D:
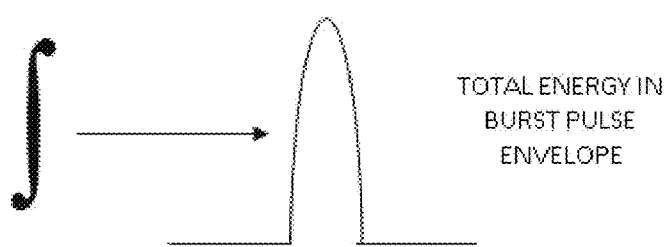
Figure 3E:
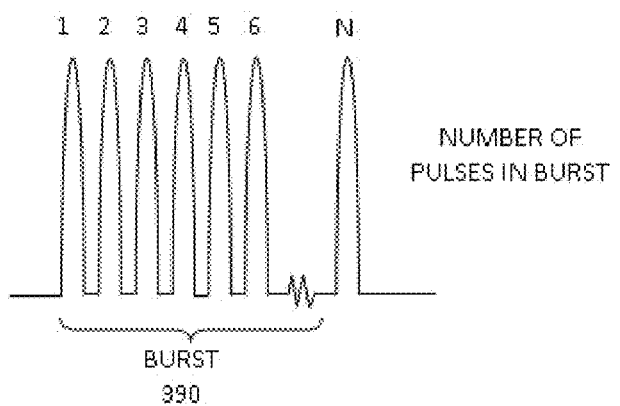

FIG. 3D illustrates the ability to control the net energy delivered to the material, based on the integrated power in the burst. FIG. 3E illustrates the ability to control the number of pulses in a given burst 390. In one example implementation, the burst of laser pulse is delivered to the material surface with a pulse train containing between 2 and 20 sub pulses into which the laser pulse is divided. This division may be created within the laser head according to one of several known approaches.

It is to be understood that any one or more of the pulse parameters shown in FIGS. 3A-3E may be employed to control the formation of filaments within the processed material.

Materials

The filamentation methods disclosed herein may be employed for the processing of a wide range of materials that are transparent to the incident laser beam, including glasses, crystals, selected ceramics, polymers, liquid-encapsulated devices, multi-layer materials or devices, and assemblies of composite materials. Substrates processed according to the methods disclosed herein may include glasses, semiconductors, transparent ceramics, polymers, transparent conductors, wide bandgap glasses, crystals, crystalline quartz, diamond, and sapphire, rare earth formulations, metal oxides for displays and amorphous oxides in polished or unpolished condition with or without coatings.

It is further to be understood that the spectral range of the incident laser beam is not limited to the visible spectrum, but may also lie in the vacuum ultraviolet, ultraviolet, visible, near-infrared, or infrared spectra. For example, silicon is transparent to above 1300 nm light but opaque to visible light. Thus, laser filaments may be formed, for example, in silicon with short pulse laser light generated at above 1300 nm wavelength either directly (e.g. viadoped fiberlasers) or by nonlinear mixing (e.g. via optical parametric amplification) in crystals or other nonlinear medium. Suitable performance can be expected with light ranging from 1200-3000 nm for a wide array of brittle materials, such as Si, SiC, GaAs, GaN, and other compound and complex compound semiconductors (for example, II-VI and similar band gap engineered materials) as well as display-related compounds, such as ITO, IPS, IGZO, etc.

Pulse Energies and Power

In order to form filaments and to sustain self-focusing, the pulse energy is selected to be within the nonlinear regime, such that burst generated filament formation is possible. According to one non-limiting example, it has been found that for the processing of soda lime glasses, pulse energies between approximately 10 µJ and 2 mJ are suitable for achieving the electric field intensity needed to reach a state where it can be sustained for self-focusing to occur. In some example implementations, the average power of the laser may lie within approximately 3 W and 150 W (or more), although it will be understood that the average power required for filament formation will depend on the pulse energies, number of pulses per burst, and repetition rate, for example.

In one example embodiment, the pulse repetition rate may range between 10 kHz and 8 MHz in terms of the pulse repetition frequency as defined by the pulse picked oscillator. These may be subsequently down-selected into bursts of less energy and delivered to the material with sub-pulse spacing equal to 1 fs or greater, up to 1 millisecond. In some example embodiments, the laser possess a beam quality, $M^2$, of less than approximately 5. An $M^2$ of approximately 1 may be employed, for example, in embodiments where the optical components are configured to create more than one focal point along the axis, and while less strict $M^2$ embodiments can be tolerated to the extent that the downstream optics are compensating for the beam's native shape. In some example embodiments, in which a filament is to be formed throughout the thickness of the material, the laser beam should be transmitted through the material (including any intervening gaps of inhomogeneous and dissimilar materials) with a transmitter power exceeding a pre-selected threshold (for example, at least approximately 50%) in order to provide sufficient luminous intensity along the beam path.

Collimation, Focal Length, Clear Aperture

In some embodiments, the optical train of the system includes one or more optical components for collimating the beam prior to focusing, in order to accommodate a variable path length between the distributed focusing element and the laser source. In some example embodiments, the numerical aperture of the collimating components is between approximately 0.1 and 0.88 NA, with an effective focal length between approximately 4.5 mm and 2.0 m. In some example embodiments, the diameter of the clear aperture may be between approximately 2 and 10 mm.

Filament Formation Mechanisms

The present methods for forming filaments therefore support new material processing applications for transparent materials that were hitherto not possible. Extremely long, C-shaped (curved) filaments are generated, by virtue of burst mode timing and distributed focusing.

Known laser processing methods, such as those employed in the Stealth Dicing and the Accuscribe systems, are driven by modifications such as those by the Yoshino et al. ["Micromachining with a High repetition Rate Femtosecond Fiber Laser" (2008), Journal of Laser Micro/Nanoengineering Vol. 3, No. 3 pgs. 157-162], are processes governed primarily by optical breakdown, where the primary mode of material removal is ablation via small explosions creating voids of variable lateral dimensions and of limited longitudinal length. Optical breakdown is the result of a tightly focused laser beam inside a transparent medium that forms a localized and dense plasma around the geometrical focus created by the material to be singulated. The plasma generation mechanism is based on initial multi-photon excitation of electrons; followed by inverse Bremsstrahlung, impact ionization, and electron avalanche processes. The Columbic explosion is responsible for creation of the localized voids and other modifications described in the literature. Such processes and systems, underscore the refractive index and void formation processes described above [U.S. Pat. No. 6,154,593; SPIE Proceedings 6881-46,], and form the basis of most short-pulse laser applications for material processing. In this optical breakdown domain, the singulation, dicing, scribing, cleaving, cutting, and facet treatment of transparent materials has disadvantages such as slow processing speed, generation of cracks, low-strength parts, contamination by ablation debris, and large kerf width—all of which require further processing to complete the part's journey to assembly into handheld electronic devices such as computers, tablets and/or phones.

In contrast, laser filamentation processing and the systems disclosed herein overcome the disadvantages of the previously known methods for internal laser processing of transparent materials, and can avoid ablation or surface damage (if desired), dramatically reduce kerf width, avoid crack generation, and speed processing times for such scribing applications. Further, high repetition rate lasers equipped with regenerative amplifiers and fast electro-optic switching allow for the enhancement of the formation of laser beam filaments with minimal heat accumulation and other transient responses of the material on time scales much faster (smaller in time) than thermal diffusion out of the focal volume (typically <10 microseconds). The focal volume produced according to the methods of the present disclosure can be manipulated by optical components in the beam path to extend many times the calculated depth of focus (DOF).

As shown in the examples below, using picosecond pulse bursts, the pulses focus in a distributed manner, it remains confined for an axial distance ranging from approximately 20 µm to approximately 10 mm, depending on the fluence of the laser pulses, and depending on the process conditions chosen. This enables dense, localized sonic pressure formation useful for via drilling with substantially zero taper, in materials where substantially non-ablative processes are responsible for removing or compressing most of the material.

Without intending to be limited by theory, it is believed that the filaments are produced by weak focusing, high intensity short duration laser light, which can self-focus by the nonlinear Kerr effect, thus forming a so-called filament. This high spatio-temporal localization of the light field can deposit laser energy in a long narrow channel, while also being associated with other complex nonlinear propagation effects such as white light generation and formation of dynamic ring radiation structures surrounding this localized radiation.

Heating by the rapid laser pulses temporarily lowers the refractive index in the center of the beam path causing the beam to defocus and break up the filament. The dynamic balance between Kerr effect self-focusing and index shifting modulated defocusing can lead to multiple re-focused laser interaction filaments through to formation of a stable filament.

Unlike known methods of filament modification, embodiments disclosed herein support the formation of continuous filaments that are extendable over a wide range of depths within a substrate. For example, in some embodiments, filaments are produced such that they are substantially continuous in nature along their path. This is to be contrasted with known filament processing methods that produce disconnected, discreet damage centers with insufficient radiation intensity (laser fluence or power) to affect any changes in the material. Accordingly, embodiments described below include methods for forming a continuous zone of photo acoustic compression along the path of a processing beam, such that the material properties of the substrate differ compared to regions not exposed to this phenomenon. In some embodiments, a continuous via is formed within the substrate by a radially uniform compression of material within the substrate.

On the simplest level, the filamentation process is believed to depend mainly on two competing processes. First, the spatial intensity profile of the laser pulse acts like a focusing lens due to the nonlinear optical Kerr effect. This causes the beam to self-focus, resulting in an increase of the peak intensity. This effect is limited and balanced by increasing diffraction as the diameter decreases until a stable beam diameter is reached that can propagate distances many times longer than that expected from a simple calculation of the confocal beam parameter (or depth of focus) from this spot size. The other key distinguishing feature is the extremely small filament size achieved by this technique.

The regime of filament formation disclosed herein is new. Filaments with a length well in excess of those previously obtained using prior filament forming methods are described herein. For example, according to selected embodiments of the present disclosure, radially compressive filaments—wherein the material is compressed revealing a cylindrical void extending through the entire thickness of the material—with a length of 10 mm or longer may be formed in suitably transparent media. Without intending to be limited by theory, the mechanism appears to involve a shockwave compression created by rapid heating via tightly spaced successive pulses of laser light (the burst pulse phenomenon) centered along the beam propagation axis in the material. Provided that the filament forming beam has sufficient intensity, it is capable of crossing air gaps and gaps of material with substantially lower indices of refraction (real and complex) and forming filaments when entering other transparent layers. White light generation and x-ray emission confirm the highly non-linear processes at work. Gurovich and Fel [ArXiv 1106.5980v1], writing about related phenomena, observed shock wave formation in the presence of ionic and electron collisions in a medium.

The photoacoustic nature of the filament forming process resides in deep ablative drilling studies carried out by Paul, et al. [Proceedings SPIE vol. 6107, 610709-1 (2006)] wherein their method of measurement involved a photoacoustic signal generated by void formation using multiple laser pulses. The present approach, involving the distributed focusing of bursts, generates an even more intense photoacoustic signal while avoiding material ablation common to other techniques. Furthermore, although a mildly thermal entrance and exit are formed at the initial and final surfaces of the target materials, the internal surfaces of the filament are substantially free from any disturbances associated with ablative micromachining.

It is further noted that the extreme pressures associated with solid state machining using plasma assisted laser ablation are reported by Kudryashov, et al. [Appl. Phys. Lett. 98, 254102 (2011)]. In their work they report plasma temperatures of 90 eV with corresponding pressures of 110 GPa. At these levels, there is sufficient energy to setup a compression wave inside the material. The present approach utilizes much closer burst spacing and has the advantage of creating an even hotter beam axis center over a shorter period of time, where the thermal shockwave outpaces any latent thermal effects rendering compression modified environs faster than the formation of any heat affected zone (HAZ) or melt. Inspection of the radiative processes that occur according to the present methods illustrates that not only is Bremsstrahlung observed, but also ultrasonic transients as well. By virtue of optical adjustment and changes in geometric focus location, the extent and the "stop-start" characteristics of this photoacoustic modification in the material can be controlled—even if multiple layers with gaps comprise the target material. The character of the edges so produced, is fundamentally distinct from those produced using slower, ablative processes that do not depend upon uniform modification of the physical and chemical properties of the materials so exposed.

Curved Filamentation

Filamentation is based on construction of a cylindrical corridor of light that carries laser energy and is known as a reservoir. The reservoir is responsible for pumping energy to the core of the propagation where the plasma channel is forming. When this reservoir is in a curved configuration it is conducive to the formation of a curved filament resulting in formation of a curved curtain in the modified zone inside the material when the sample or the laser head is moved. It is possible to curve the filament using Airy beam propagation inside the material. Using a spatial light modulator technique, an airy beam can be produced, but due to the high intensity of pulses used to form the filament, the costly modulator is damaged frequently and is not a viable industrial solution for the formation of curved filaments. Introducing considerable coma in the beam using a combination of two cylindrical lenses placed at an angle is one workable solution to induce cubical phase in the beam and indeed freedom in rotation helps to make the amount of phase change adjustable but it loses a lot of the input pulse energy via extra optics and angle optics surface reflection.

Knowledge of the cubic phase that is sufficient to make the curved filament is on the order of 10 pi to 20 pi and it is more practical to use custom made fixed cubic phase plate or mask optics that can be produced cheaply and robustly. The only major drawback is the phase change is constant. Constant phase change is desired for fixed curvature in the cuts.

Figure 4A:
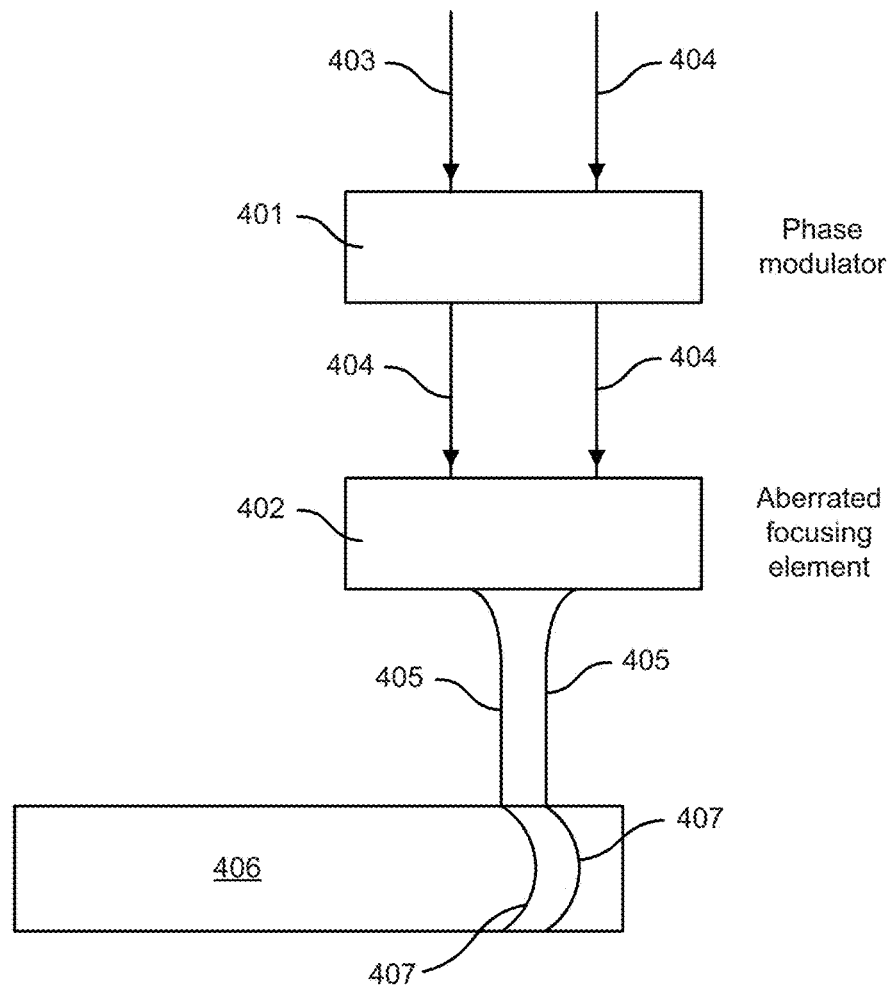
FIG. 4A illustrates the optical configuration to curve the filament reservoir resulting in curved filamentation.
Figure 4B:
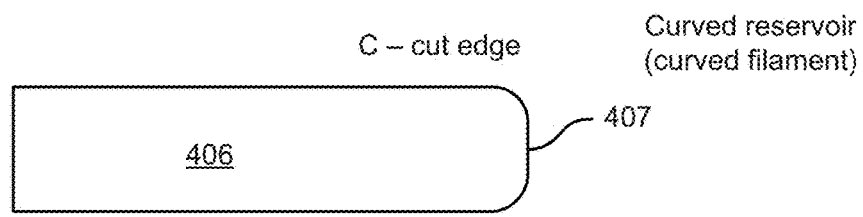
FIG. 4B illustrates the C-shaped in cross-section facet profile (C-cut edge).

FIG. 4A illustrates an optical setup. Cubic phase plate or mask 401 is located in the beam path 403 before the aberrated focusing element 402. A schematic side edge view of the sample 406 is shown in FIG. 4B after being C-cut 407 and cleaving using the apparatus of FIG. 4A. Cleaving is the act of separating the part to be removed from the part that is manufactured (the part that is to be kept). FIG. 4A illustrates incoming beam 403 which enters the cubic phase mask 401. Cubic phase mask 401 changes the phase and provides a constant output phase change 404 which is acted upon aberrated focusing element 402.

Figure 5A:
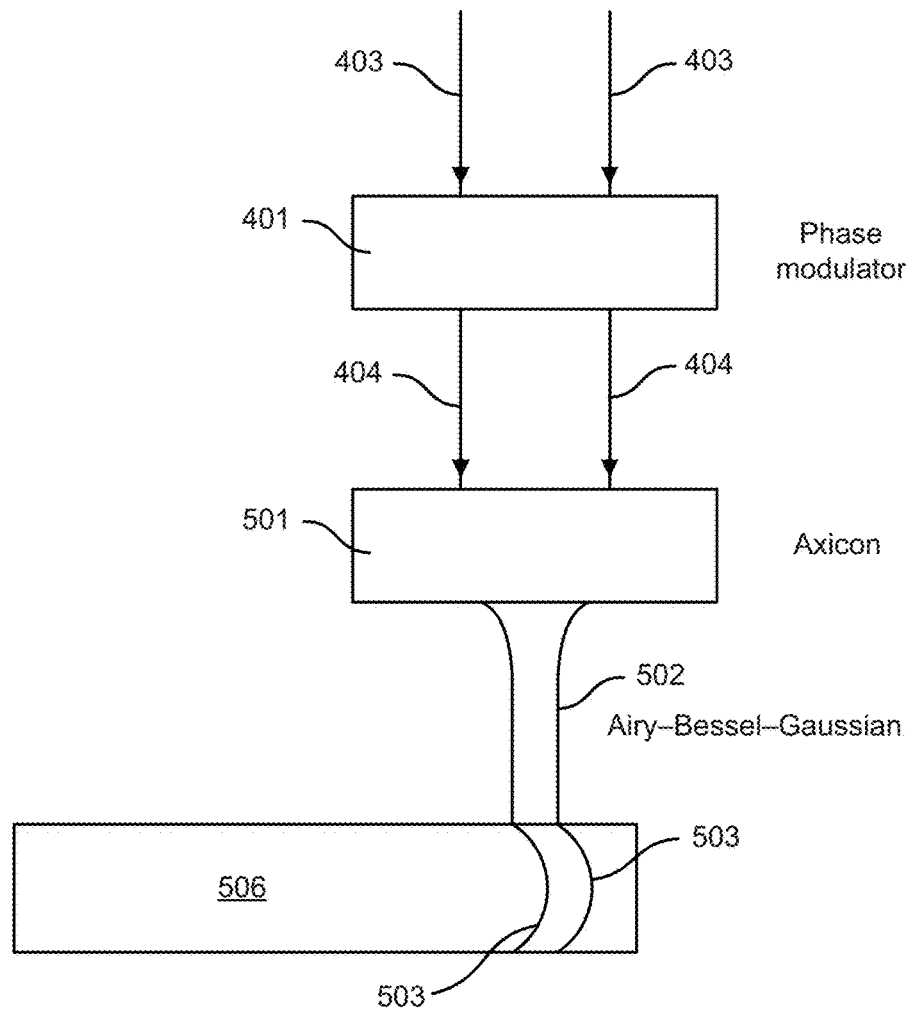
FIG. 5A illustrates the Bessel-Airy beam configuration and curved filament formation.
Figure 5B:
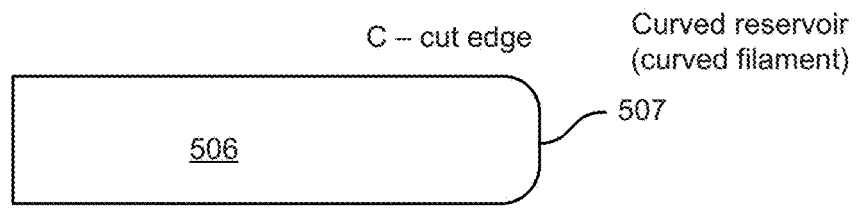
FIG. 5B illustrates the C-cut resulting from the structure of FIG. 5A.

Instead of using aberrated focusing optics to elongate the focus it is possible to use an axicon. An axicon transforms the Gaussian beam to a Bessel-Gaussian beam. The Bessel-Gaussian beam has tendency to make an elongated focus. As shown in FIG. 5A, the laser beam propagates through the cubic phase mask 401 and then focuses via axicon lens 501 generating an Airy-Bessel-Gaussian beam 502. The Airy-Bessel-Gaussian beam 502 has the property of a curved elongated focus. Using ultrafast laser pulses of the incident beam 403 will result in formation of curved filaments 503, 503 when the pulses are focused inside transparent sample 506. Pulses will start self-focusing in the curved reservoir corridor forming curved filaments 503, 503. By moving the sample or the focusing optics with respect to each other with pitches more than 2 μm but less than 10 μm it is possible to arrange the curved filaments 503, 503 beside each other. Unlike most laser processing such as stealth dicing or ablation, filaments 503, 503 form if there is no overlap between distinct pulses. Clearly this is to avoid diffraction of the reservoir by previously modified zones. Of course using a burst that has a very high frequency such as 30 MHz to 60 MHz will help guide multiple pulses in each burst to a single location to form burst curved filaments. Heat accumulation using a burst is helpful to make solid phase change inside the material resulting in easy cleaving of the sample. Without loss of generality it is possible to use a single pulse instead of a burst of pulses, but to have the same effect the per pulse energy of the laser needs to be multiple times larger if a single pulse is used to form the filament. In the filament forming region photo-acoustic compression takes place causing the transparent material to be modified. FIG. 5B is schematic view of the side edge of the C-cut 507 after cleaving. Cleaving is the act of separating the part to be removed from the part that is manufactured (the part that is to be kept).

Singulation

In some embodiments, the aforementioned curved filament forming methods and apparatus is employed for the singulation of transparent materials. The laser induced index change created during the aforementioned filamentation process may be employed to produce a filament array for singulating parts with substantially or effectively no weight loss in the material being singulated.

In one example implementation, a method of singulation may include loading, aligning, mapping and irradiating the substrate with one or more bursts of pulses of a laser Airy beam having a distributed or stretched focus, wherein the substrate is substantially transparent to the laser beam, and wherein the one or more of pulses have an energy and pulse duration selected to produce a filament.

An array of curved filaments is formed by translating (moving) the transparent material substrate relative to the focused laser beam. Moving the transparent material substrate produces additional filaments in desired locations. The filament array thus defines an internally scribed path for cleaving the substrate. These arrays can exist in one or more dimensions around the line of translation, and can be formed in straight or curved profiles, where an example curved profile 605 is shown in FIG. 6.

The filaments may be formed such that they extend over a substantial fraction (for example, more than approximately 15% of target material, and typically greater than 50 μm, or in some cases, greater than 1 mm or even 10 mm) of the target material.

In some embodiments, the methods disclosed herein involve lateral translation of the focused laser beam to form an array of closely positioned filament-induced modification tracks. This filament array defines a pseudo-continuous curtain of modifications inside the transparent medium without generating laser ablation damage at either of the top or bottom surfaces (unless specifically desired). This curtain renders the irradiated material highly susceptible to cleaving when only very slight pressure (force) is applied, or may spontaneously cleave under internal stress. The cleaved facets may be devoid of ablation debris, show minimal or no microcracks and microvents, and accurately follow the flexible curvilinear or straight path marked internally by the laser with only very small kerf width as defined by the self-focused beam waist.

In some embodiments, for selected materials and processing conditions, once a filamentation array is formed in the transparent substrate, only small mechanical pressure may be required to cleave the substrate into two parts on a surface shape that is precisely defined by the internal laser-filamentation curtain. In certain materials and especially in chemically strengthened glasses, the separation event may be spontaneous, requiring no further steps to affect singulation.

The user selectable process conditions may be chosen to vary the time interval between exposure and separation from 0 seconds (immediately separates upon exposure) to an infinite number of seconds (requires a follow-on step of some kind to complete the singulation process).

In some embodiments, the substrate may be cleaved using one or more of the following: additional laser processing steps, physical heating, cooling, and/or mechanical means. It has been found that when a filament array is formed according to the aforementioned filament generation methods, the cleavage step requires far less applied force and produced superior edge quality relative to known approaches. Depending upon the nature of the material, the process of scribing and separation (singulation) may take place in a single step requiring no further exposure to any forces or thermo-mechanical tension.

In some embodiments, the filament array may be formed such that the filaments touch (e.g. are tangential to one another; e.g. for filaments circular in the distribution about the beam center or axis of incidence) or are separated by a user-selectable distance, which can be variable. In some embodiments, the distance between filaments forming the array is constant. In other examples, the properties of the material may be such that improved singulation is obtained for filament arrays that are formed with variable spacing along the perimeter of the shape to be removed or cut. The suitable filament spacing for efficient cleaving will thus generally be determined by the characteristics of the material and the requirements of the application, including the physical/electrical properties of the singulated part. In addition to the varying beam parameters such as pulse width, pulse-to-pulse separation within a burst, burst repetition rate, wavelength, and pulse energy, the polarization state may be varied by utilizing a polarization rotation element (such as a waveplate) and varying the degree of rotation from about 1 degree to about 80 degrees and from random polarization to linear polarization to circular polarization or to some mixture of the two during processing as required by the desired end result. It is observed that edge quality and therefore post-singulation edge strength can be modulated by using this technique, as well as others.

As noted above, the laser source may include a burst pulse laser, for example, a pulsed laser with a regenerative amplifier, but other burst pulse systems may be employed. For example, in one embodiment, a multi-pass amplifier equipped with a fast electro-optic switch, either internally or externally mounted, may be employed to deliver the beam to the substrate via computer controlled steering (and optional focus mechanisms and polarization control), and the substrate may be translated relative to the focused laser beam with a constant velocity along the path of exposure. In some embodiments, the tangential velocity may be constant when forming curved portions of a filament array, such as when forming filament arrays at corners, such that the array of filaments so created is constant in its spatial irradiance, dose and temporal characteristics. In other embodiments, computer control may be employed to translate the beam relative to a fixed substrate. In other embodiments, the computer control may be employed to control the motion of both the beam and the substrate.

For example, the translation rate employed to form the filament array may be determined according to the velocity of a simple linear stage supporting the substrate, or may be determined according to the combination of the stage velocity and the beam velocity, in the case of a scanning system based on telecentric or non-telecentric final objectives, depending upon the desired process.

The translation rate may be selected to produce user-selectable filament spacing on a micron scale, depending, for example, upon the desired characteristics (physical, optical, electrical, chemical, thermal, etc.) of the materials thus singulated. Accordingly, by varying one or more of the processing parameters in real-time, filament arrays with locally controlled or tailored properties may be formed—i.e. arrays of filaments where the properties of the filaments vary spatially among different regions of the material, thereby spatially modifying properties of the material itself. This aspect of laser processing has not been achievable using previously known laser singulation approaches and systems. Indeed, the present method of forming arrays with locally-controlled properties may be employed for a wide range of applications. A non-limiting list of example properties that may be locally controlled according to the present filamentation process include electrical performance, light output and post-singulation break strength.

Properties of the beam of laser pulses employed to form the filament array may varied according to pre-selected, and computer controlled, process parameters, in order to provide sufficient beam intensity within the substrate to cause self-focusing of the laser beam. For example, the laser beam may be controlled such that the filament is formed at all points along the beam axis within the material to be processed. In other words, the beam properties may be controlled as to exceed a particular characteristic energy level to create acoustic compression within the substrate(s), thus rendering it (them) singulated or ready to be so, depending upon the nature of the target materials.

In some embodiments, the filament arrays are formed by filaments that are substantially symmetric about their longitudinal axis (usually the incident axis of the laser beam). The length of the filament may be controllable (for example, from approximately 100 µm to over 10 mm) by changing the process parameters, such as power, focusing characteristics and beam shape, which are controlled machine parameters. Varying such parameters may result in a change in the characteristics associated with the photoacoustic modification created in the material.

An important distinction exists between chirped pulses and the burst pulses employed in the methods of the present disclosure, both in terms of how they are generated, but also in terms of the energy characteristics of each, with the burst machining method exhibiting much greater flexibility in processing, particularly when coupled with a scanner and the appropriate focusing optics to render telecentric behavior over a defined field size.

In one embodiment, a system is provided for auto-focusing of the filament forming beam in real-time. For example, in some implementations, the beam can be moved at high rates of speed using galvanometers and/or acoustic optical deflectors to steer the beam in a coordinated manner fully under computer control.

Figure 6A:
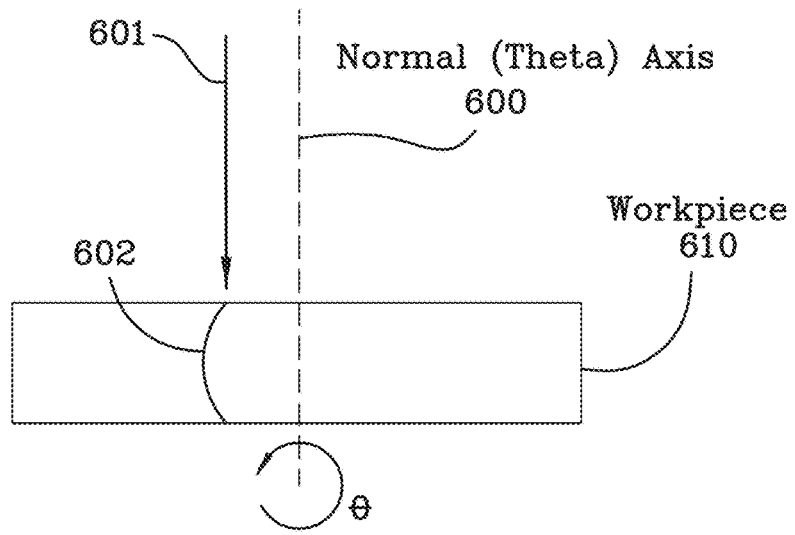
FIGS. 6A-6C illustrate an example embodiment using a theta stage for the positioning of the apparatus for the creation of curved filament cleave planes.
Figure 6B:
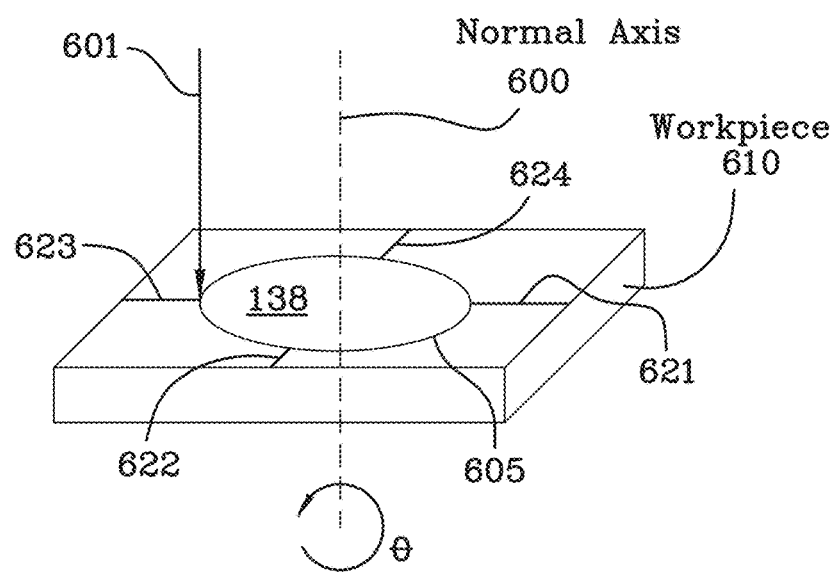
Figure 6C:
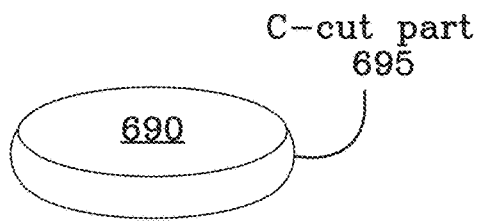

FIGS. 6A-6C illustrate an example embodiment using a theta stage for the positioning of the apparatus for the creation of curved filament cleave planes. FIG. 6A is a side view of the workpiece 610 illustrating a C-shaped filament 602 therein. The structure of FIGS. 6A, 6B and 6C enables the production of parts with C-shaped edges. For example, using the theta stage, a circular path 605 can be traced producing a part as shown in FIG. 6C with a cut-out having a C-cut edge 695. FIG. 6B is a perspective view of the workpiece 610 illustrated in FIG. 6A. FIG. 6C illustrates a generally disk-shaped part 690 cut from the workpiece illustrated in FIGS. 6A and 6B with a circularly extending C-shaped edge 695. Scribed release lines 621, 622, 623, and 624 are created by the filamentation apparatus and process described and shown herein. The scribed release lines enable the release/separation of the part 690 from the workpiece.

FIGS. 6A-6C show the curved cut out approach for making internal features with C-shaped (curved) edges requiring no post singulation processing to achieve the desired curved result. In FIGS. 6A-6C, the beam track is accomplished via rotation around the theta axis 600 with a fixed incidence Airy laser beam, equal to the slope desired on the final part edge 695. This non-limiting embodiment enables curve cutting and translation of the rotary stage as an apparatus to support the creation of complex cutouts via filament arrays. Due to mechanical lockage, scribed release lines of 621, 622, 623, 624 are needed to release the desired disk 690 with curved edges from the main workpiece 610. Scribed release lines 621, 622, 623, and 624 are created by the filamentation apparatus and process described and shown herein.

The aforementioned apparatus, with multi-axis rotational and translational control, may be employed for the purpose of bringing the beam on to the work piece(s) at variable focus positions, non-normal angles of incidence and at variable, recipe controlled positions to create curvilinear zones of filament arrays, for the purpose of singulating the parts into component pieces, cutting out closed-form shapes and creating products such as cover glass for mobile devices with high break strength, which is presently not possible using the techniques currently employed by the device manufacturers.

Those skilled in the art will recognize that all of these axes are not required for all applications and that some applications will benefit from having simpler system constructions. Furthermore, it is understood that the apparatus shown is but one example implementation of the embodiments of the present disclosure, and that such embodiments may be varied, modified or hybridized for a wide variety of substrates, applications and part presentation schemes without departing from the scope of the present disclosure.

Apparatus for Complex Spline Processing

In some embodiments, a system for forming a curved filament within a substrate according to the methods disclosed above may include a rotary stage and an automated gimbal mounted final objective (gamma axis, γ), coupled with coordinated Z position control, for rendering complex spline parts. Such an embodiment supports the creation of high bend strength parts at high yield and without need for further refinement or post processing.

Figure 7A:
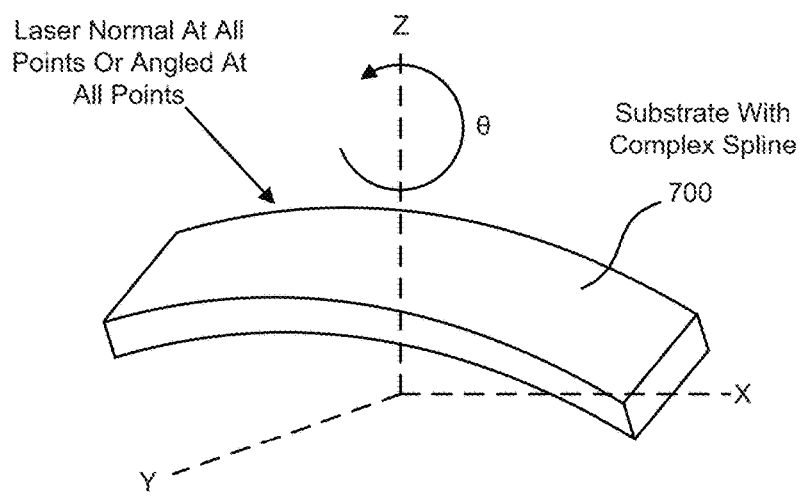
FIGS. 7A-7D illustrate an example embodiment showing the formation of complex spline parts from curved targets by servoing the z and "steering the beam" with adaptive optics, which are also controlled by servo motors. The beam (FIG. 7A) and/or part (FIGS. 7B, 7C)) can be rotated, tilted or otherwise manipulated to create a very wide process window and capability for producing parts with complex surface curvature.
Figure 7B:
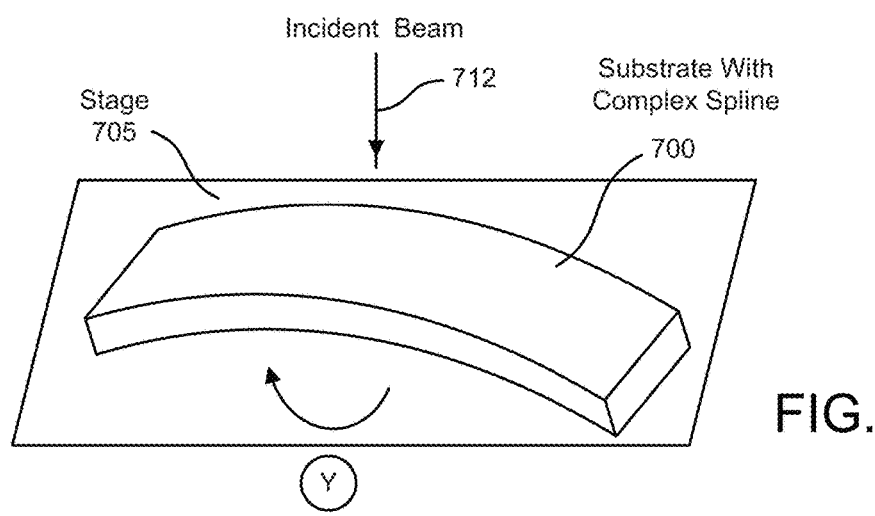
Figure 7C:
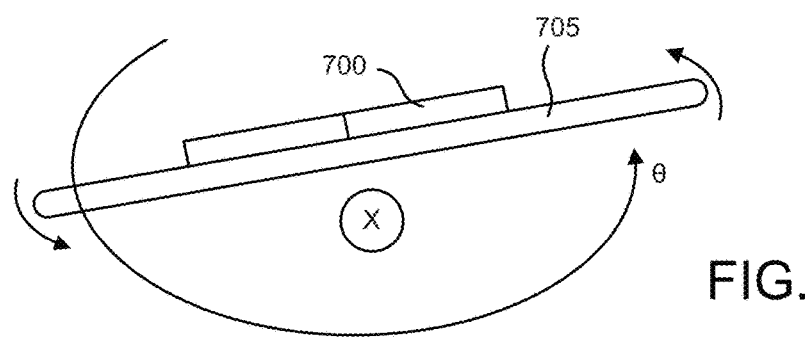

FIGS. 7A, 7B and 7C illustrate processing of samples with a complex spline surface 700, from which parts may be cut of arbitrary shape with normal or non-normal beam incidence across the entire perimeter of the part shape as dictated by the desired characteristics of the part after it has been singulated (e.g. strength, conductivity, electrical efficiency of devices therein/thereon, etch resistance or efficacy, etc.).

Coordinated rotation as indicated by theta and gamma about the Z, Y axes, respectively with appropriate translation in the XY plane coupled with auto focus for constant objective lens spacing, can be employed to generate parts with user-selectable (over a reasonable range) properties depending upon the application of the part and its required/desired performance envelope. The optics (not shown in FIGS. 7A-7D) and/or the part 900 being processed may be translated and/or rotated to achieve the desired part.

FIG. 7A illustrates rotation about the Z axis as indicated by the Greek letter θ and FIG. 7A illustrates rotation about the Y axis as indicated by the Greek letter γ. Reference numeral 712 illustrates the incident beam whose characteristics and qualities have been described above. FIG. 7A is not illustrated with stage 705.

Figure 7D:
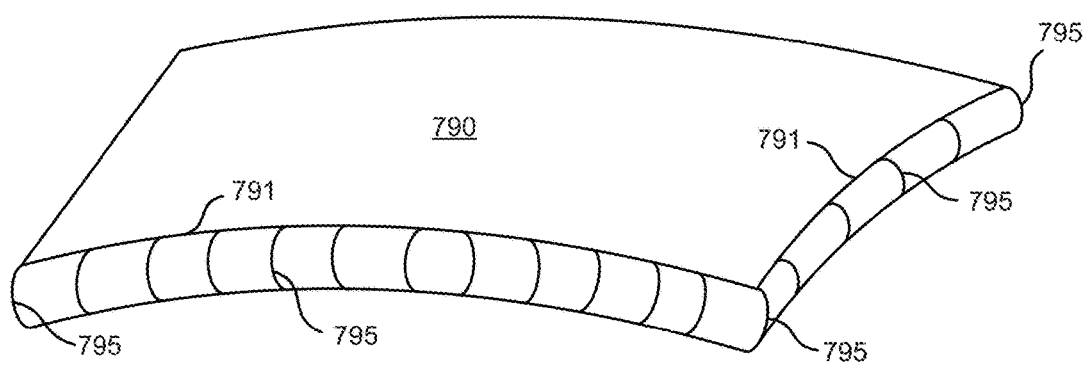

FIG. 7B illustrates complex spline 700 on stage 705 capable of rotation about the Y axis as indicated by the Greek letter γ. FIG. 7C illustrates the translation and/or rotation of the part 700 being processed via a stage 705. FIG. 7D provides an example implementation of such an embodiment, showing a glass part 706 processed using a curved filament formation to exhibit a C-cut shaped edge. 707.

Processing of Multiple Layers

In other embodiments, multi-level curved filaments can be produced across several layers of glasses separated by transparent gas or other transparent materials, or in multiple layers of different transparent materials. The substrate may include two or more layers, wherein a location of a beam focus of the focused laser beam is selected to generate filament arrays within at least one of the two or more layers.

For example, the multilayer substrate may comprise multi-layer flat panel display glass, such as a liquid crystal display (LCD), flat panel display (FPD), and organic light emitting display (OLED). The substrate may also be selected from the group consisting of autoglass, tubing, windows, biochips, optical sensors, planar lightwave circuits, optical fibers, drinking glass ware, art glass, silicon, III-V semiconductors, microelectronic chips, memory chips, sensor chips, electro-optical lenses, flat displays, handheld computing devices requiring strong cover materials, light emitting diodes (LED), laser diodes (LD), and vertical cavity surface emitting laser (VCSEL).

Alternatively, the location of a beam focus of the focused laser beam may be first selected to generate filament arrays within a first layer of the two or more layers, and the method may further comprise the steps of: positioning a second beam focus to create an index change within a second layer of the two or more layers; irradiating the second layer and translating the substrate to produce a second array defining a second internally (internal to the stack, not the individual layers) scribed path for cleaving the substrate. The substrate may be irradiated from an opposite side relative to when irradiating the first layer. The substrate may be further illuminated from top and bottom or from multiple angles of incidence, either in concerted or subsequent process steps. Furthermore, prior to irradiating the second layer, a position of the second beam focus may be laterally translated relative a position of the beam focus when irradiating the first layer. A second focused laser beam may be used to irradiate the second layer. This beam can be supplied by the system from a single source or a second source. Multiple beams operating in concert can therefore process multiple substrates in parallel.

Figure 8A:
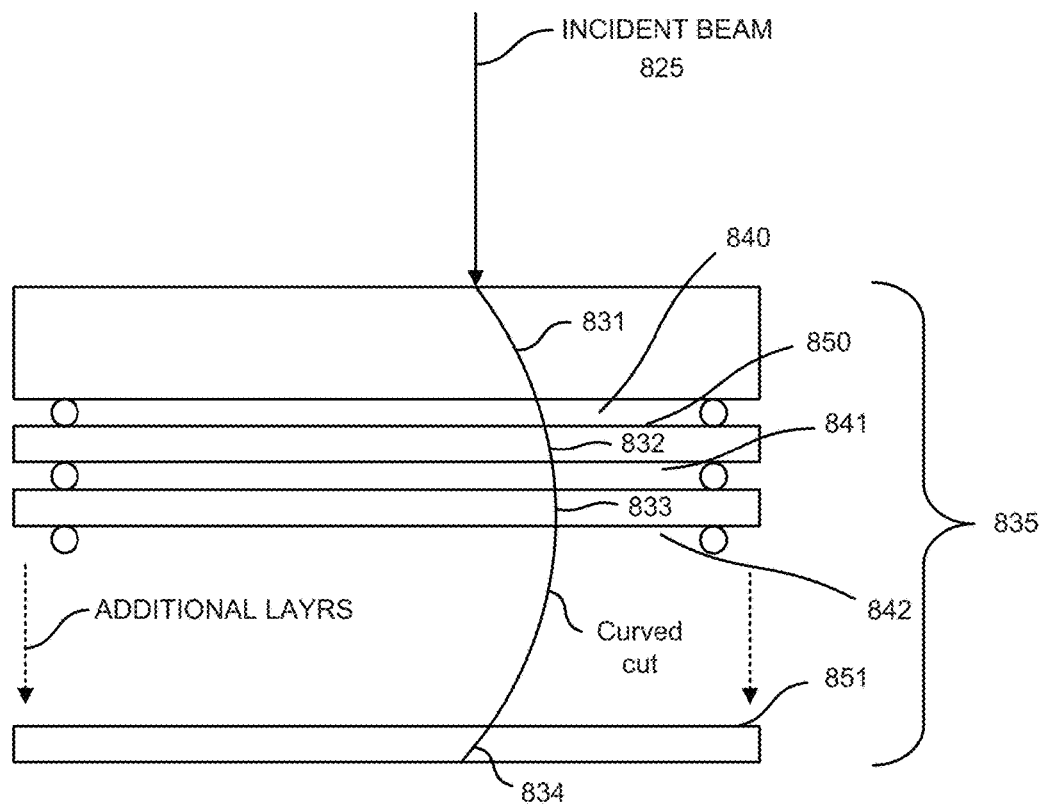
FIG. 8A illustrates an example embodiment in which a multilayer substrate can be cut or processed in single pass, C-cutting of all layers.

FIG. 8A illustrates how multiple stacks of materials 835 (optionally having gaps 840, 841, 842 having larger or smaller refractive index, n) can be singulated by the formation of curved filament zones 831, 832, 833, 834 within the materials by an Airy beam 825. In addition, conditions may be chosen to affect ablation at intermediate 850 and terminal 851 interfaces of the stacks. This is primarily adjusted by controlling the onset of filament formation, typically a set distance from the final objective lens, to coincide with the Z position of the target layer wherein filament formation is desired. By adjusting the Z height of the part or optic, a high degree of control can be afforded the user in determining where the curved filament first forms. Also changing the cubic phase mask having different phase characteristics will affect the filament bend curvature.

Figure 8B:
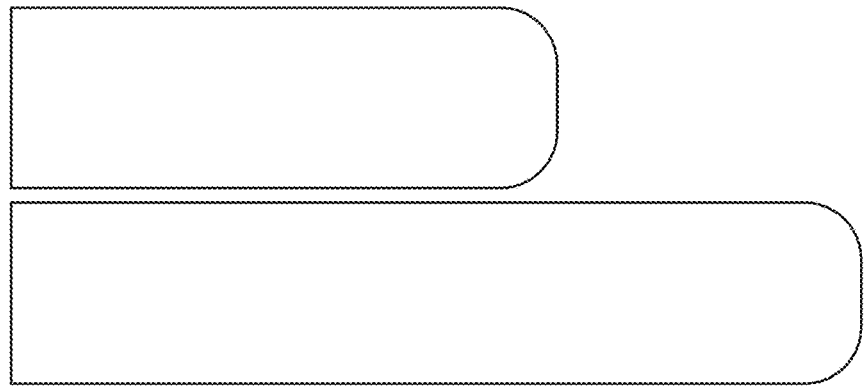
FIG. 8B illustrates the processing of a two layer laminated glass substrate having a C-cut in each layer.
Figure 8C:
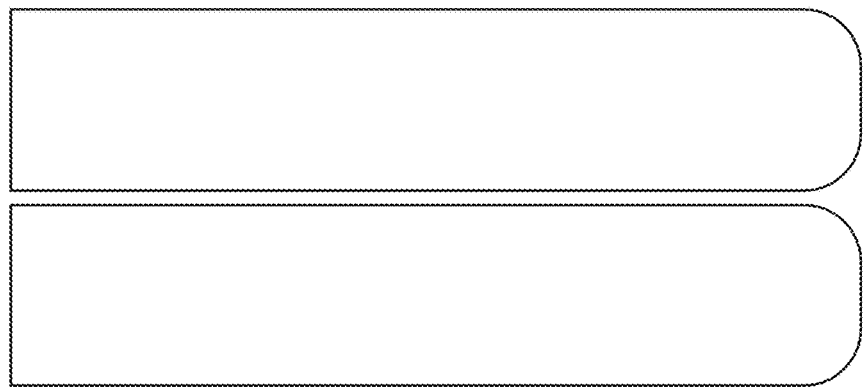
FIG. 8C illustrates the processing of a two layer laminated glass substrate having a C-cut in each layer but having an offset cut.

FIG. 8B shows an example implementation of an embodiment in which a double layer laminated glass substrate was processed using curved filament formation in a single pass for each layer at a speed of 0.5 m/s. In some embodiments, by controlling the laser exposure to only form filaments in the solid transparent layers, one can avoid ablation and debris generation on each of the surfaces in the single or multi-layer plates. This offers significant advantages in manufacturing, for example, where thick glasses or delicate multilayer transparent plates must be cleaved with smooth and crack free C-cut facets. The embodiment of FIG. 8C presents laminated samples where offset is needed between the layers. A clear example would be a display where offset is needed for LCD driver installation.

The invention claimed is:

1. A method for machining a workpiece, comprising the steps of:
   providing a laser beam having bursts of ultrafast laser pulses, the workpiece being transparent to the laser beam;
   locating an optic in the path of the laser beam that induces a cubic phase in the laser beam;
   focusing the laser beam to form a distributed focus, the distributed focus having a C-shape due to the cubic phase in the focused laser beam;
   locating the workpiece such that at least a portion of the C-shaped distributed focus is within the workpiece, the focused laser beam having sufficient energy density to form a continuous C-shaped filament within the workpiece, the continuous filament inducing a C-shaped material modification in the workpiece; and
   translating the workpiece laterally with respect to the laser beam to form an array of C-shaped material modifications that define a scribed path for cleaving the workpiece.

2. The method of claim 1, wherein the optic that induces the cubic phase is selected from the group consisting of a cubic phase plate, a cubic phase mask, and a spatial light modulator.

3. The method of claim 1, wherein the optic that induces the cubic phase has two cylindrical lenses arranged at an angle to introduce coma to the laser beam.

4. The method of claim 1, wherein the cubic phase produces an Airy laser beam, the distributed focus of the Airy laser beam having a C-shape.

5. The method of claim 1, wherein the distributed focus is formed by at least one aberrated focusing element.

6. The method of claim 5, wherein the at least one aberrated focusing element is an axicon.

7. The method of claim 6, wherein the focused laser beam is an Airy-Bessel beam.

8. The method of claim 5, wherein the at least one aberrated focusing element induces spherical aberration.

9. The method of claim 1, wherein the workpiece is made of a material selected from the group consisting of a glass, a crystal, a ceramic, and a semiconductor.

10. The method of claim 1, wherein a beam waist of the laser beam is formed external to the workpiece.

11. The method of claim 1, wherein the filament is formed by self-focusing of the laser beam due to the nonlinear Kerr effect.

12. The method of claim 1, wherein the material modification is one of the group consisting of defects, color centers, and micro cracks.

13. The method of claim 1, wherein the material modification is a cylindrical void.

14. The method of claim 13, wherein the cylindrical void is created by radially compressing material about the continuous C-shaped filament.

15. The method of claim 1, wherein the continuous C-shaped filament with the workpiece has a length in the range of 100 micrometers to 10 millimeters.

16. The method of claim 1, wherein the continuous C-shaped filament has a length exceeding about 1 millimeter.

17. The method of claim 1, wherein the ultrafast pulses have a pulse duration of less than about 100 picoseconds.

18. The method of claim 1, further comprising the step of cleaving the workpiece along the scribed path.

19. The method of claim 18, wherein the cleaving creates at least one singulated part having at least one curved edge.

20. The method of claim 19, wherein the at least one curved edge has a surface roughness of less than about 10 micrometers.

21. The method of claim 1 wherein each burst of ultrafast laser pulses includes a plurality of pulses.

22. The method of claim 21 wherein each burst of ultrafast laser pulses includes 2 to 20 pulses.

* * * * *